(12) United States Patent
Mittal et al.

(10) Patent No.: US 7,596,634 B2
(45) Date of Patent: Sep. 29, 2009

(54) NETWORKED APPLICATION REQUEST SERVICING OFFLOADED FROM HOST

(76) Inventors: Millind Mittal, 800 E. Charleston Rd., #29, Palo Alto, CA (US) 94303; Murali Repakula, 4088 Lakemont Ct., San Jose, CA (US) 95148

( * ) Notice: Subject to any disclaimer, the term of this patent is extended or adjusted under 35 U.S.C. 154(b) by 1293 days.

(21) Appl. No.: 10/352,800

(22) Filed: Jan. 27, 2003

(65) Prior Publication Data
US 2004/0117496 A1 Jun. 17, 2004

Related U.S. Application Data

(63) Continuation-in-part of application No. 10/248,029, filed on Dec. 12, 2002.

(60) Provisional application No. 60/437,809, filed on Jan. 2, 2003, provisional application No. 60/437,944, filed on Jan. 2, 2003.

(51) Int. Cl.
*G06F 15/16* (2006.01)

(52) U.S. Cl. .................. 709/250; 709/238; 709/228

(58) Field of Classification Search ............... 709/201, 709/206, 230, 238, 250, 212, 239; 719/313, 719/328; 713/152
See application file for complete search history.

(56) References Cited

U.S. PATENT DOCUMENTS

| | | | |
|---|---|---|---|
| 5,991,299 A | 11/1999 | Radogna et al. | |
| 6,226,680 B1 * | 5/2001 | Boucher et al. | 709/230 |
| 6,389,479 B1 | 5/2002 | Boucher et al. | |
| 6,430,184 B1 | 8/2002 | Robins et al. | |
| 6,460,120 B1 | 10/2002 | Bass et al. | |
| 7,181,531 B2 * | 2/2007 | Pinkerton et al. | 709/238 |
| 2001/0037406 A1 * | 11/2001 | Philbrick et al. | 709/250 |
| 2002/0087732 A1 * | 7/2002 | Boucher et al. | 709/250 |
| 2002/0091844 A1 * | 7/2002 | Craft et al. | 709/230 |
| 2002/0095519 A1 * | 7/2002 | Philbrick et al. | 709/250 |
| 2003/0046330 A1 * | 3/2003 | Hayes | 709/201 |
| 2003/0061505 A1 * | 3/2003 | Sperry et al. | 713/200 |
| 2003/0154298 A1 * | 8/2003 | Lu | 709/230 |
| 2003/0200284 A1 * | 10/2003 | Philbrick et al. | 709/219 |
| 2004/0042487 A1 * | 3/2004 | Ossman | 370/466 |
| 2004/0054814 A1 * | 3/2004 | McDaniel | 709/250 |
| 2004/0062245 A1 * | 4/2004 | Sharp et al. | 370/392 |
| 2004/0111523 A1 * | 6/2004 | Hall et al. | 709/230 |

OTHER PUBLICATIONS

"CPC710-133 PCI Bridge and SDRAM Memory Controller," product information IBM Microelectronics Division, Hopewell Junction, NY (2002).
"TsI107™: PowerPC Host Bridge," product information Tundra Semiconductor Corp., Ottawa, Ontario, Canada (2003).
Donovan et al. "Pixel Processing in a Memory Controller," IEEE Computer Graphics and Applications 15:51-61 (1995).

* cited by examiner

*Primary Examiner*—Salad Abdullahi
(74) *Attorney, Agent, or Firm*—Mark Lauer; Silicon Edge Law Group LLP

(57) ABSTRACT

Offloading application level communication functions from a host processor. The offloading apparatus can be configured as either a pre-processor or as a co-processor. An interface is provided for receiving a network message sent to the host. An engine performs processing of the network message above OSI level 4. In one embodiment, in a fast-path, a response to the message is sent back to the network without any involvement by the host, providing a complete offload. For other messages, certain pre-processing can be performed, such as parsing of a header, message authentication, and look-up of meta-data. The results of the look-up are then passed to the host with the processed header, simplifying the tasks the host needs to perform. The messages and data are transferred to the host using control and data buffers.

27 Claims, 18 Drawing Sheets

| | | | | | | |
|---|---|---|---|---|---|---|
| 7 | TELNET RFC 854 | FTP File Transfer Protocol RFC 959 | SMTP Simple Mail Transfer Protocol RFC 821 | SNMP Simple Network Management Protocol RFC 1098 | DNS Domain Name System RFC 1034 | |
| 6 | | | | | | |
| 5 | | | | | | |
| 4 | | TCP RFC 793 | | UDP RFC 768 | | |
| 3 | ARP RFC 826 | RARP RFC 903 | IP RFC 791 | ICMP RFC 792 | BOOTP RFC 951 | |
| 2 | 802.3 | 802.5 | 802.2 | other | | |
| 1 | | | Medium-Access Protocols | | | |

FIG.2
(PRIOR ART)

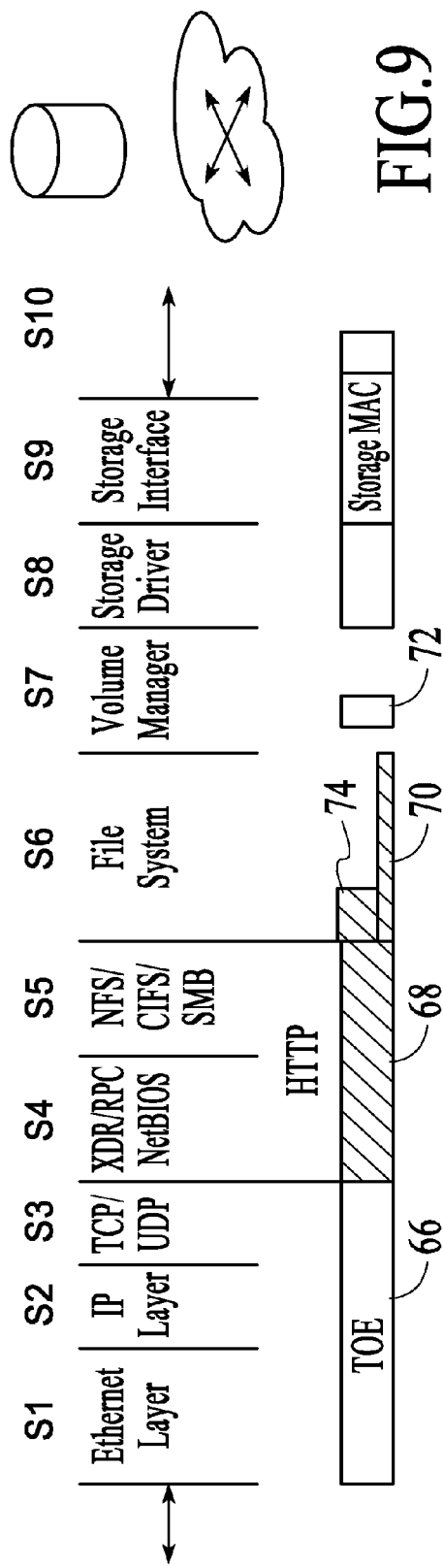
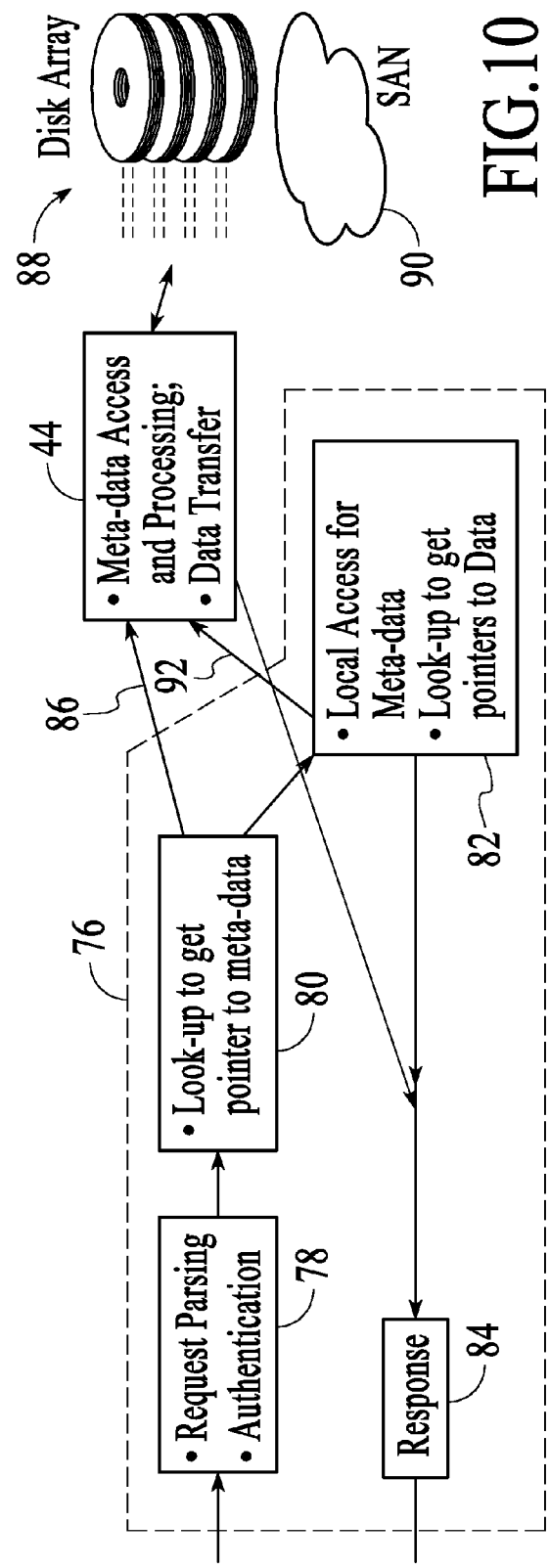

NETWORKED APPLICATION REQUEST SERVICING OFFLOADED FROM HOST

CROSS-REFERENCES TO RELATED APPLICATIONS

This application is a continuation-in-part of and claims priority from U.S. application Ser. No. 10/248,029, filed Dec. 12, 2002, and also claims priority from Provisional Application Nos. 60/437,809 and 60/437,944, both filed on Jan. 2, 2003, all of which are incorporated herein by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to offloading network communication functions from a host processor.

OSI Layers

The Open Systems Interconnection (OSI) model describes seven layers for a data communications network. This modularization allows the layers to be independently handled. When messages are sent across a network, headers for each layer encapsulate other layers and their headers. In the transmitting direction, each layer may add its own header. In the receiving direction, the appropriate header can be dealt with, then stripped off by one layer, which passes the remaining message to another layer. FIGS. 1 and 2 illustrate these layers and the protocols and hardware that operate at each layer.

1. Physical Layer. This provides for the transmission of data, and handles the electrical and mechanical properties. A repeater functions at this layer.

2. Data Link layer. This layer controls the transmission of blocks of data between network peers over a physical link. A bridge functions at this later. Ethernet is an example protocol.

3. Network Access layer. This layer routes data from one network node to others, using routing information and performing fragmentation and reassembly as needed. Routers function at this layer. Protocols include IP, X.25 and Frame Relay.

4. Transport layer. This layer provides flow control and error control. TCP and UDP are example protocols.

5. Session layer. This layer provides for applications to synchronize and manage their dialog and data exchange.

6. Presentation layer. This provides services that interpret the meaning of the information exchanged. An example protocol is XDR (eXternal Data Representation).

7. Application layer. This layer directly serves the end user. It includes applications such as file transfer and database access. Example protocols are FTP (File Transfer Protocol), NFS (Network File System), CIFS (Common Internet File System), HTTP (Hyper Text Transfer Protocol), database query, SQL (Standard Query Language), and XML (Extensible Markup Language).

Types of Storage

There are multiple ways that data and files can be accessed over a network. FIG. 3 illustrates some of these.

Direct Attached Storage (DAS). Direct attached storage is the term used to describe a storage device that is directly attached to a host system. The simplest example of DAS is the internal hard drive of a server computer, though storage devices housed in an external box come under this banner as well. Other computers on a network can access the data through communications with the host, which handles the communications in addition to its other processing tasks. For example, a disk drive attached to application server 12 in FIG. 3 would be DAS.

Network Attached Storage (NAS). Network Attached Storage is a server attached to a network and dedicated to only file sharing. NAS storage can be expanded by adding more servers, each attached to the network with its own IP address. NAS 14 is shown attached directly to a network through Ethernet switch 16.

Storage Area Network (SAN). A SAN is a subnetwork of storage devices that are connected to each other and to a server, or cluster of servers, which act as an access point to the SAN for clients on a main network. SAN storage is expanded by adding more disks to the subnetwork behind the same server. Storage switch 18 is an example of an access point to storage devices 20 and 22 on a subnetwork accessed through storage switch 18. For example, switch 18 could include a SAN controller, and storage 20 could be a RAID controller which accesses a group of disk drives.

RAID (Redundant Array of Independent Disks) is a system where a group of disks are used together, with data being written across them redundantly or with error correction, providing fault tolerance that allows data recovery where one of the disks fails.

Storage Access Protocols

SCSI (Small Computer System Interface) is a parallel interface used for storage. It provides faster transmission rates than standard serial or parallel ports, and is used to connect computers to disk drives and printers. Many devices can be attached to a single SCSI port, so it is really an I/O bus.

There are two main standard protocols for storage access over a network, both of which use SCSI.

Fibre channel (fiber with an 're') interconnects storage devices allowing them to communicate at very high speeds and allowing devices to be connected over a much greater distance. SCSI commands are still used for the actual communication to the disk drives by the DAS, NAS or SAN server at the end of the fiber.

iSCSI (internet SCSI) encapsulates SCSI commands in an IP packet, allowing data to be transported to and from storage devices over a standard IP network.

Routing and Storage Access Equipment

Routers have been developed to route messages over a network to the appropriate destination. An example of a router is shown in 3COM U.S. Pat. No. 5,991,299.

Specialized network processors have been developed for the specialized flow control and routing of messages. An example of such a network processor is shown in IBM U.S. Pat. No. 6,460,120. Such a processor typically deals with the first three layers of the OSI model. A processor which accesses layers 4 and above for flow control, to make routing decisions based on quality of service, is shown in Top Layer Networks U.S. Pat. No. 6,430,184. This allows distinguishing between priority-based email and bandwidth—guarantee-based multimedia.

At the destination, and at the source, of network communications, the communication is handled by an ordinary computer or server with a general purpose processor. Communication is only one of the functions handled by the processor. With the increasing demands for file access over networks, handing the communication can take an unacceptable amount of the processors time. An example structure at a host connected to a network is shown in FIG. 4.

Network Interface Cards (NICs) handle the layer 1 and layer 2 communication tasks for the end-point processor. NIC 24 is shown connected to the network for this function.

Recently developed TCP/IP Offload Engines (TOE) have been developed to handle the layer 3 and layer 4 communications for the processor, in particular handling the TCP/IP protocol stack. TOE 26 is shown in FIG. 4 between NIC 24 and host 28. An example is the TOE of Alacritech, Inc., such as described in U.S. Pat. No. 6,389,479.

In prior systems, the host processor would run a piece of software commonly referred to as the TCP/IP stack. TOE systems are able to offload this at an interface which requires minimal communication with the host. The host will configure the stack, by providing information such as the domain name, broadcast address, etc. The TOE will then handle establishment of network connections, data transmission and reception, error handling, and connection tear-down when a transmission is completed. Some TOEs, such as those by Alacritech, require the host to establish the network connection, then take over from there.

As shown in FIG. 4, TOE deals with MAC header 29 and TCP-IP header 30, and strips them off from message 32. The message is then forwarded to host 28. In the opposite direction, a message from the host would have the TCP-IP and MAC headers added by TOE 26 for transmission through the network. FIG. 3 illustrates a number of examples of where a TOE could be placed in a network. The TOE processes up through layer 4 of the OSI protocol layers. The higher layers are not dealt with, although the categorization of data in fly-by sequencers, including session level and higher layers, is discussed in US Published Applications 2002/0091844 and 2001/0037406.

Protocols for Accessing Files Over a Network

Accessing files over a network is accomplished using one of a number of protocols, such as File Transfer Protocol (FTP), NFS (Network File System), introduced by Sun Microsystems for sharing files between UNIX systems, and CIFS (Common Internet File System) introduced as a PC networking standard by Microsoft. CIFS was originally known as SMB (Server Message Block).

The commands for accessing data come from Remote Procedure Calls (RPC) from a client across the network, or the NetBIOS (Network Basic Input Output System), an application programming interface (API) on the host that augments its BIOS for network operations. The RPC commands let a remote client run a command on a host across the network.

The data is organized using meta data, which is like an index system for the data. Meta data indicates where the data came from, when it was created or modified, keywords describing the data contents, etc. Meta data can be organized in an External Data Representation (XDR), a presentation layer protocol, originally developed by Sun Microsystems, that allows the exchange of information between different systems and programming languages.

One of the data structures that may be found in meta-data is inodes (index nodes), which contain information about files in UNIX systems. Inodes provide information such as user and group ownership, access mode (read, write, execute permissions), type (regular, directory, special, FIFO), table of contents to disk blocks, file size, and pointers to the data blocks.

The present invention is intended to work with any of the above types of storage, and any communication standard, such as iSCSI or Fibre Channel.

BRIEF SUMMARY OF THE INVENTION

The present invention provides a method and apparatus for offloading from a host processor the servicing of incoming application level requests over a network. The offloading apparatus can be configured as either a pre-processor or as a co-processor. An interface is provided for receiving a network message sent to the host. An engine performs selected processing of the network message above OSI level 4.

In one embodiment, the application requests serviced are for data access. These can be accesses of databases, web pages, or file access (FTP, NFS, CIFS). Requests can be inspected, and those which are not for data or file access can simply be passed through to the host.

In one embodiment, in a fast-path, a response to the message is sent back to the network without any involvement by the host, providing a complete offload. For other messages, certain pre-processing can be performed, such as parsing of a header, message authentication, and look-up of meta-data. The results of the look-up are then passed to the host with the processed header, simplifying the tasks the host needs to perform. The messages and data are transferred to the host using control and data buffers.

Unlike a TOE, which doesn't need access to host data, much of application level offloading does. The invention uses a cache with a copy of the meta-data or data available to the host processor for its application level processing. This allows the application level processor to handle application level communications.

In particular, the present invention is directed to file access over a network. The invention handles both the reception and transmission of messages related to file access. The embodiments also deal with the handling of response messages from the host to the network.

In a pre-processor implementation, the pre-processor sits between the host and a TOE. The pre-processor is largely transparent to the TOE, passing its messages through to the host, so that the TOE continues to believe it is speaking directly to the host.

In one embodiment, the pre-processor sits between the host and an external CPU which has an Ethernet interface. The external CPU has the functionality of a TOE.

For further understanding of the nature and advantages of the invention, reference should be made to the following description taken in conjunction with the accompanying drawings.

BRIEF DESCRIPTION OF THE DRAWINGS

FIGS. 1 and 2 are diagrams of the OSI layers (prior art).

FIG. 9 is a diagram illustrating the steps in a storage access operation offloaded by an embodiment of the invention.

FIG. 10 is a block diagram illustrating a fast-path response according to an embodiment of the invention.

DETAILED DESCRIPTION OF THE INVENTION

Offloading from the host processor any more than the protocol processing done by the TOE devices is problematic. Since higher levels involve access to data under host control, it is undesirable to relinquish host control of the organization and handling of that meta-data.

The present invention recognizes the advantages to be gained with a pre-processor or co-processor approach which offloads standard parts of the processing completely from the host processor. In addition, for certain other operations, advanced or speculative execution of some common functions are done and passed on to the host to reduce the host processing time. This is done using a copy of the host meta-data in a cache that is kept coherent with the host cache. This avoids interfering with the host accessing of its own cache.

Figure 1:
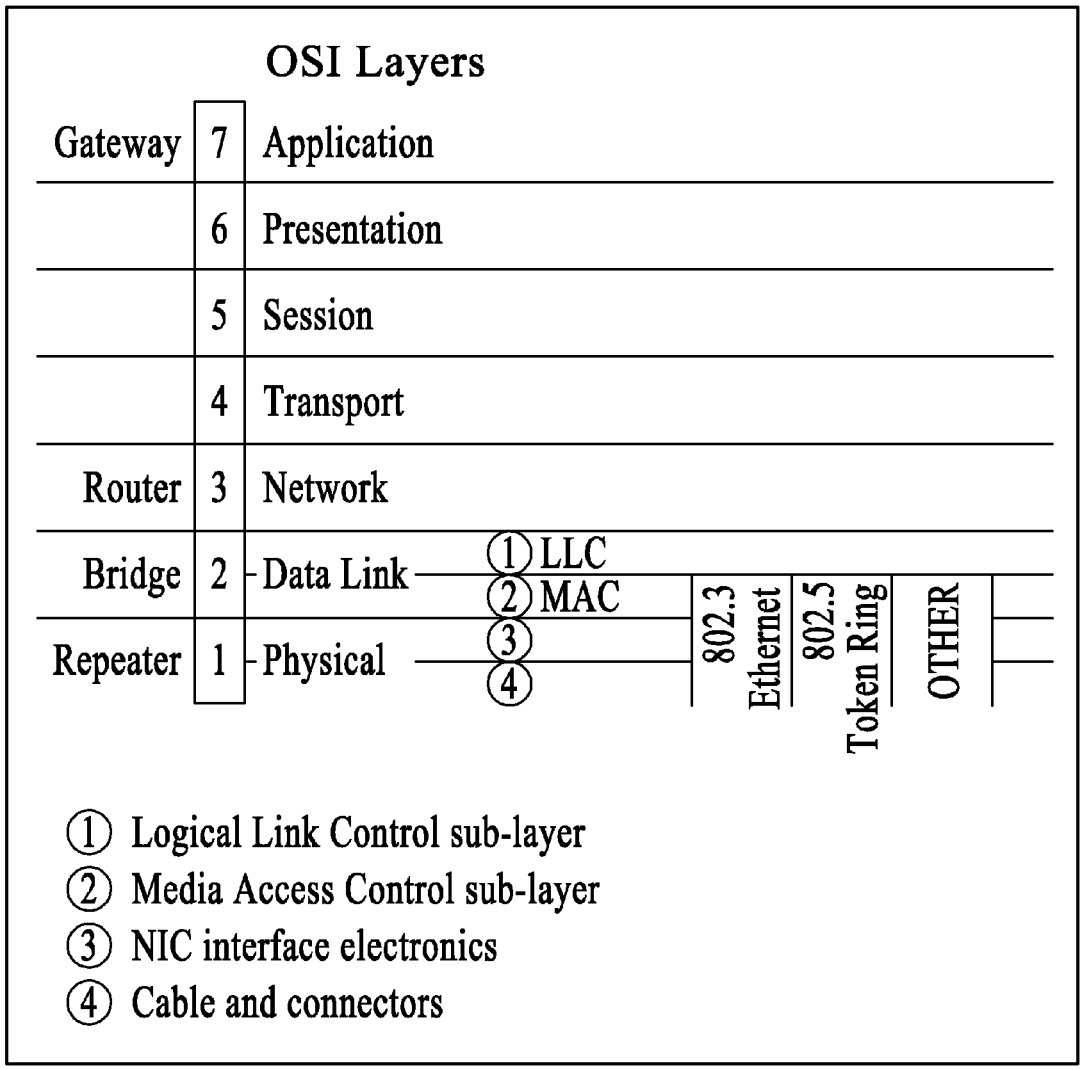
Figure 3:
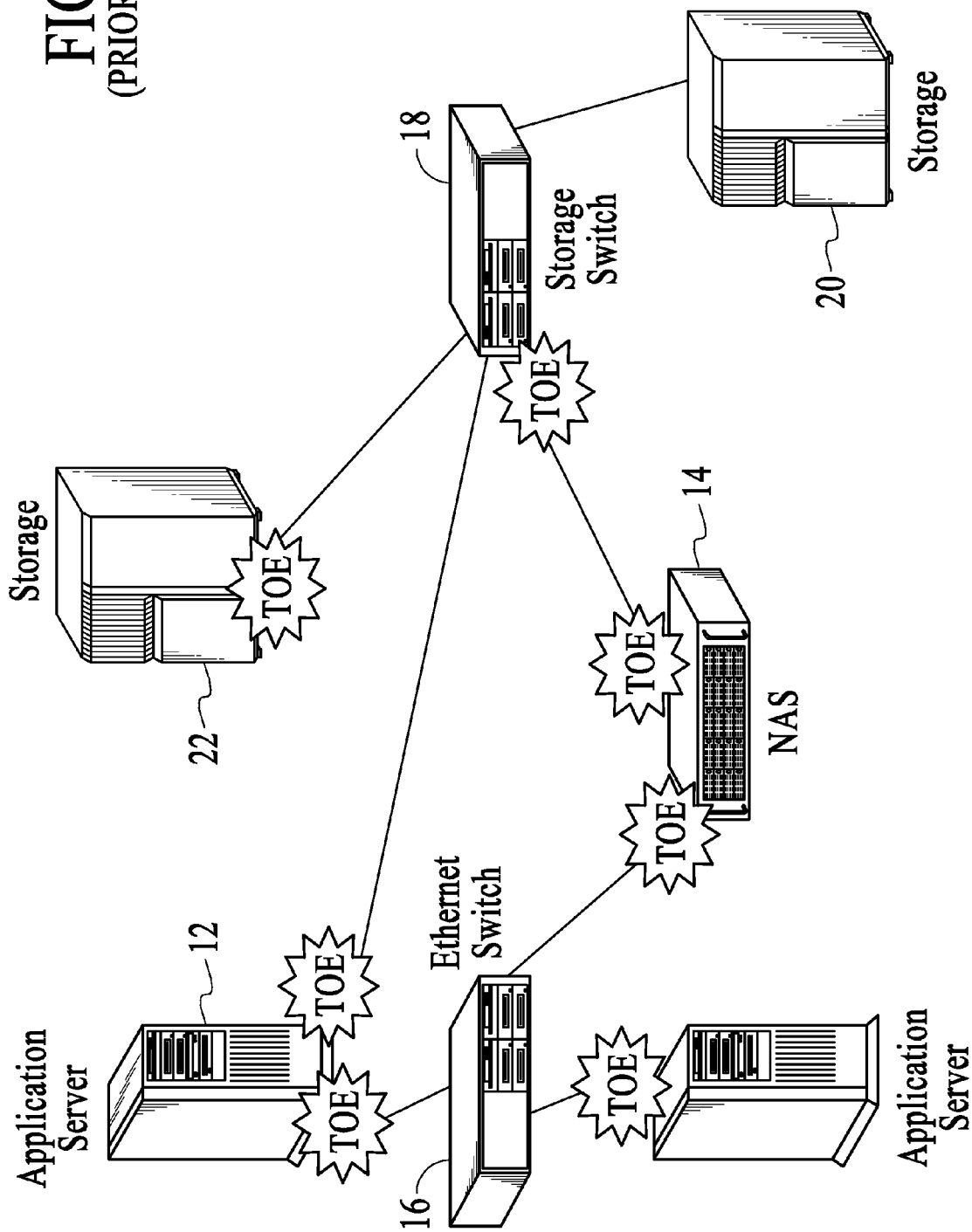
FIG. 3 is a prior art diagram of a network showing different placements of a TOE, such as with DAS, NAS or SAN servers or computers.
Figure 4:
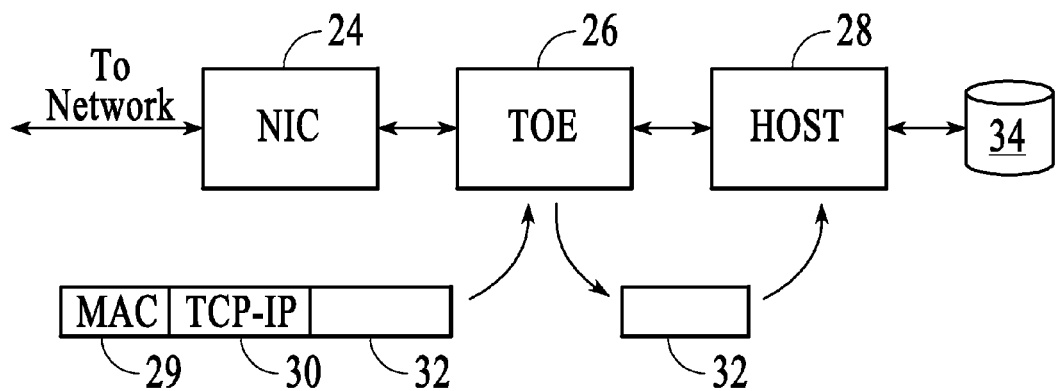
FIG. 4 is a block diagram of a prior art system incorporating a TOE into the communication between a host and a network.
Figure 5:
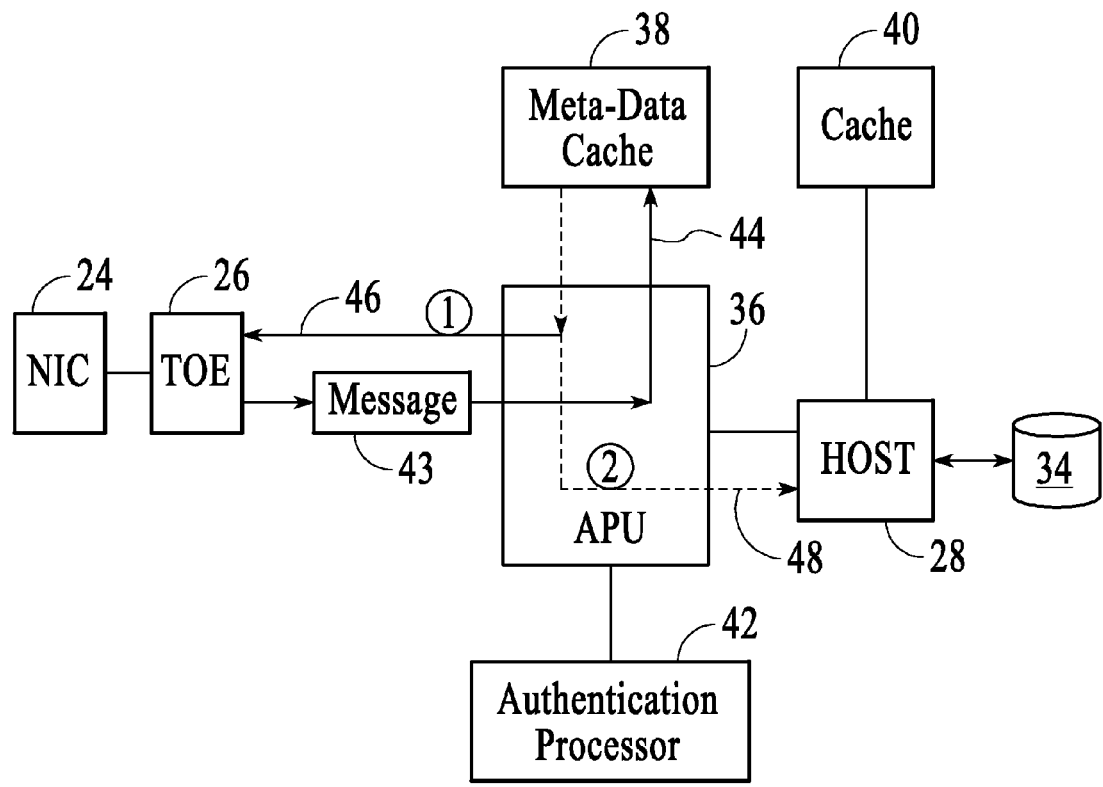
FIG. 5 is a block diagram of an embodiment of the invention using a pre-processor configuration.

FIG. 5 is a block diagram of a pre-processor embodiment of the present invention. A specialized processor according to the invention, labeled an Application Processor Unit (APU) 36 is shown between TOE 26 and host 28. TOE 26 sits between a network port 24 and the APU. The TOE can be on a Network Interface Card (NIC), for example. APU 36 includes its own cache memory 38, which holds a copy of the meta-data in the host cache memory 40. APU 36 may also include a connection to an external processor or processors for certain services, such as an authentication processor 42 for performing the security functions necessary for authenticating messages received.

A message 43 passed to APU 30 by TOE 26 is first examined to determine if it is the type of message the APU would handle. For example, the APU may be configured to only handle file access messages, passing other messages on to host 28. After doing any necessary parsing and authentication of the message header, any required look-up can be done in cache 38 as illustrated by arrow 44. After the look-up, there are two options. First, if the look-up completes the commands required by message 43, the return message is sent back to TOE 26, as illustrated by arrow 46. Second, if more processing is required, the looked-up data and parsed or otherwise processed header are forwarded to the host 28 as illustrated by arrow 48. For example, the host 28 may be required to recover data from storage 34. The returned messages are handled by APU 36 to forward them from host 28 back to TOE 26.

APU 36 also acts as a semi-transparent interface between TOE 26 and host 28. APU 36 will forward messages sent from host 28 to TOE 26 and vice versa during configuration, initializing of a session with TOE 26, or other needed communications. The APU can perform some processing on outbound response messages from the host where appropriate. For messages from TOE 26 which are not of the type handled by APU 36, these are simply forwarded through to host 28.

Figure 6:
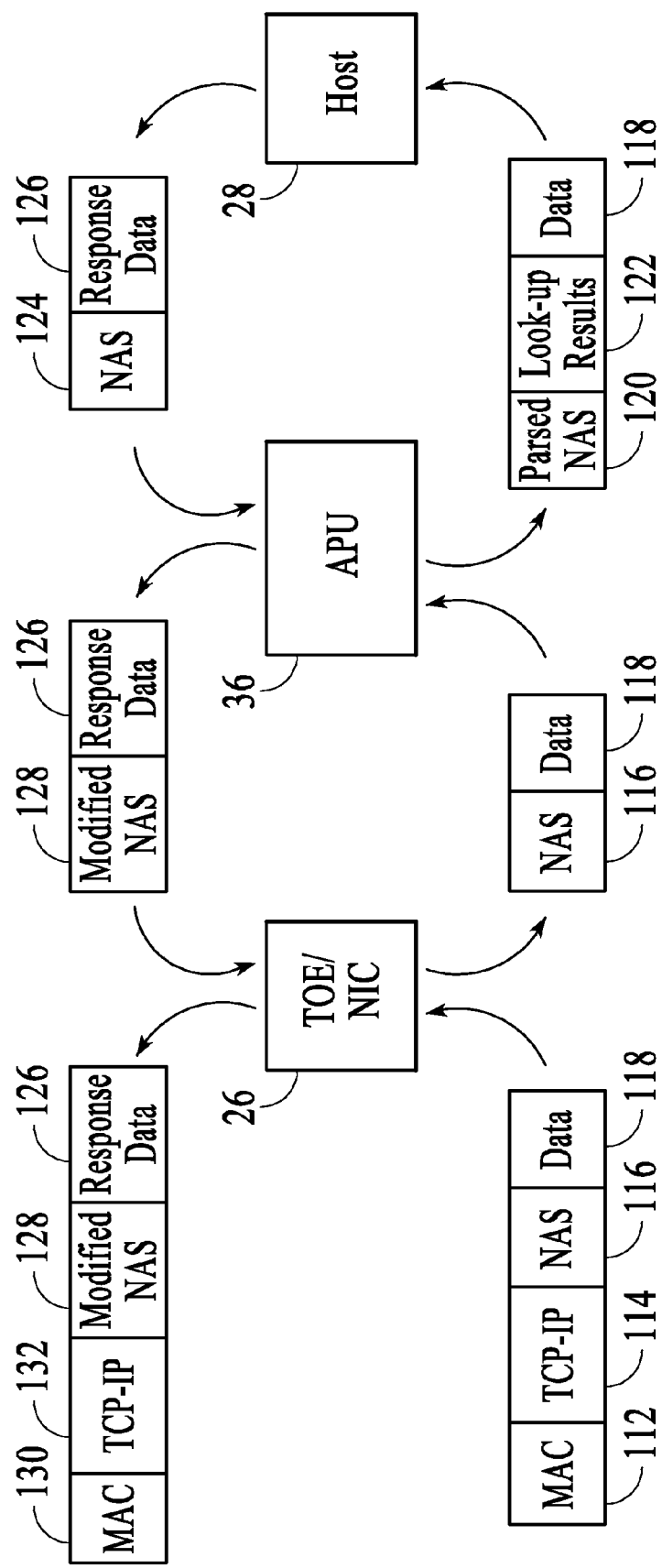
FIG. 6 is a diagram illustrating the processing of headers in the embodiment of FIG. 5.

FIG. 6 illustrates the processing of a message according to one embodiment of the invention, with respect to the example of a NAS message. As shown in FIG. 6, an incoming message 110 includes an MAC header 112, a TCP/IP header 114, an NAS header 116 and the body of the message or data 118. This is processed by TOE 26, which essentially processes and removes MAC header 112 and TCP/IP header 114. TOE 26 then passes on a message to APU 36 which consists of NAS header 116 and data 118. The APU does its processing, and then provides to the host a parsed or otherwise processed NAS header 120, look-up results 122 and the data 118.

The host then does any data look-up responding to commands in the message, and returns the message with an NAS return header 124 and response data 126. APU 36 modifies the NAS header as needed, and provides a modified NAS header 128 and a response data 126 to TOE 26. TOE then adds a MAC header 130, a TCP/IP header 132 and sends the message along to the network.

In some cases, APU 36 generates a modified NAS header 128 and response data 126 by locally processing incoming NAS header 116 and associated data 118, without passing any processed message to the HOST 28.

Figure 7:
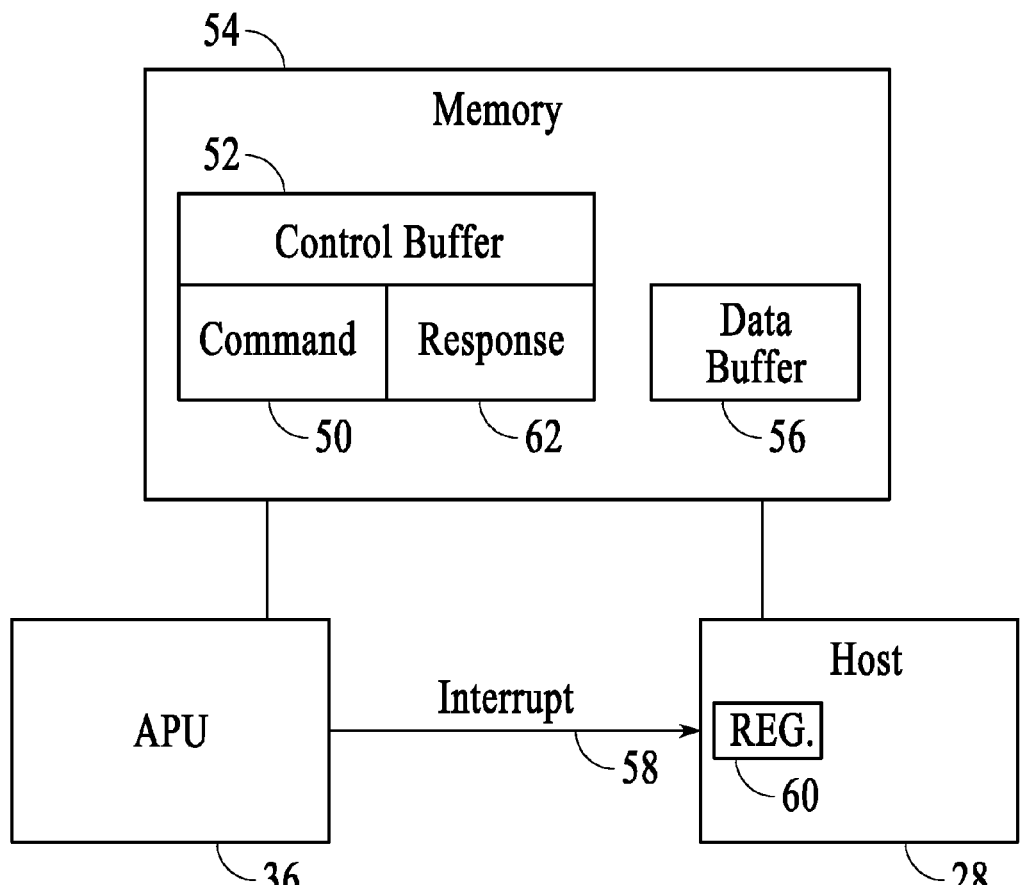
FIG. 7 is a diagram illustrating the control and data buffers for passing information between the invention and a host.

FIG. 7 illustrates how a message may be passed from APU 36 to host 28. When a look-up has been done, and a header parsed, the parsed or otherwise processed command is put in a command portion 50 of a control buffer 52 in a memory 54. This memory may be, for example, SRAM, which is accessible by both APU 36 and host 28. The looked-up data or other data in the message is placed in a data buffer 56. An interrupt signal is then sent on a line 58 to an interrupt register 60 in host processor 28. The interrupt register can contain a pointer to the portions of memory 54 containing the command and the data.

When the host processes the commands and prepares a response, it similarly places the data in data buffer 56 and places the response in a response buffer 62 in control buffer 52.

Figure 8:
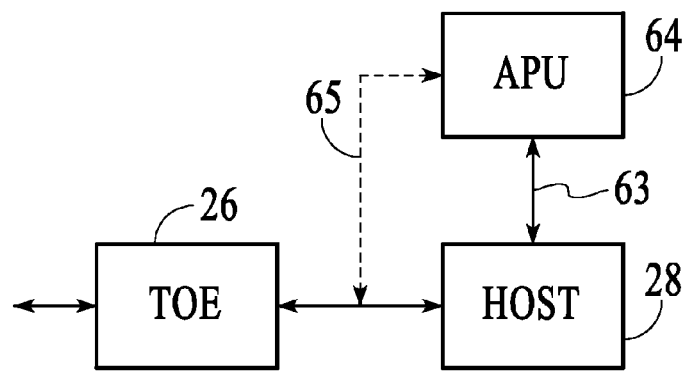
FIG. 8 is a block diagram illustrating a co-processor implementation of the invention.

FIG. 8 illustrates an alternate embodiment of the invention in which the special APU processor of the invention is configured as a co-processor 64. It would still contain its separate, duplicate cache connection as shown in FIG. 5, and use a common memory with control and data buffers for exchanging data with the host, as illustrated in FIG. 7. However, the host would receive the commands from TOE 26, and then pass appropriate ones to the APU for complete or partial processing, as appropriate. The coprocessor could be connected to only the host through a separate interface 63, or could be connected to a common bus 65 with the TOE.

FIG. 9 is a diagram illustrating the pipeline of functions performed to access storage devices over a network. This should not be confused with the seven OSI layers discussed previously. As shown, there are ten steps shown in the pipeline between the Ethernet layer S1 and the actual physical access of the disks S10. Block 66 indicates the steps handled by the TOE. The present invention handles block 68, which offloads database processing such as, for example, the NFS/CIFS and HTTP protocols. In one embodiment, all cases of NFS and HTTP are offloaded, while for CIFS some cases may have to be passed on to the host processor. Blocks 70 and 72 illustrate the offloading of meta-data look-up functions within the file system (S6) and the volume manager (S7). In addition, as indicated by block 74, the full file system function can be offloaded for some of the functions, specifically functions that do not modify any meta-data structure and do not require any storage operation.

Completely offloaded messages include those where the requester simply wants to know what the meta-data is. Another example is when the data to be read is in the cache memory. Partial offload includes, for example, accessing of data in the actual final storage, whether disk drives or otherwise. In this case, a pointer to the location in storage may be contained in the cache, and this can be looked up by the processor of the present invention and passed along to the host, saving the host the pointer look-up time.

FIG. 10 illustrates some of the steps performed by an embodiment of the processor of the present invention, and in particular fast-path steps. Dotted line 76 indicates the fast-path operations. In a first step 78, an incoming message is parsed as required, and any necessary authentication is done. This authentication can be done by use of a co-processor in the form of an authentication processor connected via an external interface. Next, in step 80, a look-up is done to get a pointer to the desired meta-data in the cache. Next, for fast-path operations, the meta-data is accessed in the local cache as indicated in step 82. A response 84 is then generated.

A non fast-path operation could involve a cache miss, in which case the message is passed, as indicated by arrow 86, directly to the host for further processing. Also, if actual data in a disk array 88 or an SAN 90 is required, from step 82 a look-up is done to get the pointers to that data, and this is passed along to the host as indicated by arrow 92. The host, in step 94, performs any necessary meta-data accessing and processing, and does the data transfer by accessing the data in the disk array and performing the command, with data being sent back to the network as required.

In one embodiment, instead of sending the message to the host, it could be redirected anywhere on a network. Alternately, a message could be both sent to the host and redirected, or a portion could be sent to the host, and a portion redirected. The redirection can be with or without preprocessing. These messages are basically requests for information, and can be sent to more than one device to retrieve different portions of the total desired information.

Figure 11:
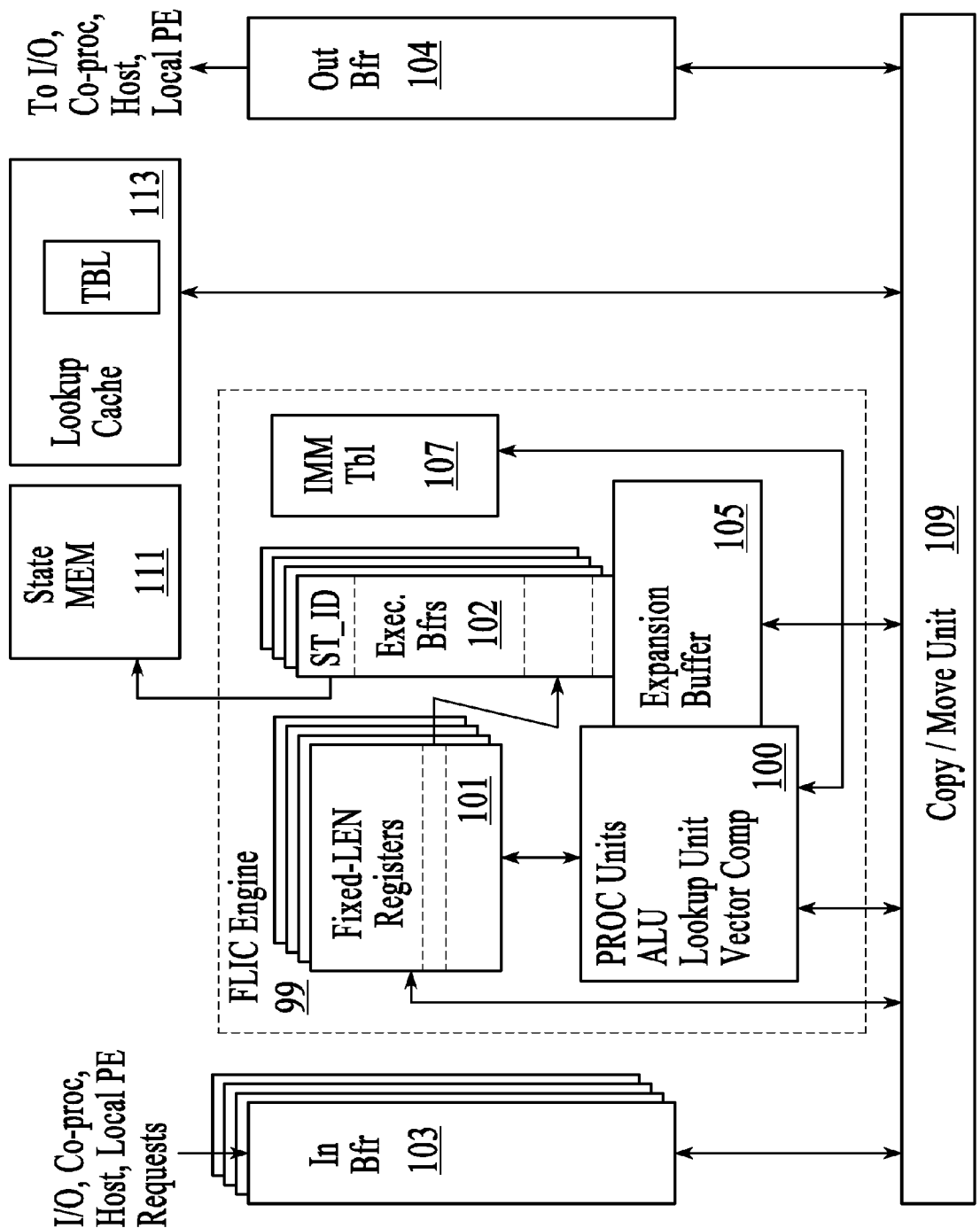
FIG. 11 is a block diagram of the architecture of a processor according to an embodiment of the invention.

FIG. 11 is a block diagram of one embodiment of a processor according to the present invention. Only a brief overview is given here, since a more complete description is provided in co-pending application Ser. No. 10/248,029, entitled "Functional-Level Instruction-Set Computer Architecture for Processing Application-Layer Content-Service Requests Such as File-Access Requests" filed Dec. 12, 2002, the disclosure of which is incorporated herein by reference. The processor contains one or more slices 99 of an FLIC (Functional-Level Instruction-set Computing) engine. The engine includes a processing unit 100 with an ALU, a branch unit, look-up unit, vector compare unit, compound expression unit, and bitmap unit. A number of fixed length registers 101 normally store data operands, with variable length operands in execution buffers 102 and expansion buffers 105. Sate parameters can be copied from state memory 111. Immediate table 107 contains pre-defined constants, structure templates, and rule values that can be used by instructions.

Input buffers 103 and output buffers 104 are also provided. A copy/move unit moves data between the input buffers, FLIC engine and output buffers, and allows the FLIC engine to access memory resources such as lookup cache 113

NFS Processing

The APU processor of the present invention supports both NFS V3, V4 and CIFS protocols. NFS requests arrive as RPC messages. A connection may utilize either secure or standard RPC messages. Prior to decoding the field of the RPC, there may also be a need to change the byte ordering of the input message depending upon the byte ordering employed by the host processor. The APU also provides hardware for XDR functions.

Once the byte order for the RPC message is re-arranged so that it is compatible with the order assumed for processing in the APU, the APU determines whether the RPC message is a secured RPC message. In case secure RPC messaging is being utilized, prior to NFS fields extraction, the RPC message authentication is performed. The APU utilizes an external security processor, or the external general purpose processor. The external processor may be connected through a dedicated optional system bus or through a shared system bus. An external security co-processor may be connected through a dedicated co-processor bus, or a PCI-X bus.

After the RPC message has been authenticated, a flexible hardware extraction unit scans the RPC header to determine whether the request is a NFS request. If not, the request is ignored, and no processing is done, and it is passed on to the host. If the request corresponds to an NFS request, a combination of hardware and software (running on the embedded processor) does the mapping of the NFS request to the Virtual File System (VFS) call.

NFS V3 is stateless. The NFS V3 processing does not involve examining any data-structures associated with the connection on which the request arrives. Also, for NFS V3 there is only one NFS request per RPC message.

NFS V4 has states. Also, one RPC message may carry compound requests. In case of compound requests, the requests are parsed and processed, one at a time.

CIFS Processing

CIFS requests are received as SMB messages. Some of the messages are passed on to the host processor without processing, and others, which involve File System access, are converted to a VFS interface.

HTTP Processing

The APU receives HTTP messages as over TCP. Again, a combination of hardware and software performs the function of mapping a HTTP request to VFS.

In case a secure HTTP request is received, the message is first passed to an external SSL co-processor. The decoded message is then processed by the APU.

Generalized Look-Up

For all file access oriented protocols, the first stage of the APU extracts the parameters of the request, and creates a Virtual File System (VFS) interface request. Several of the FS requests involve accessing a meta-data cache to either determine the pointer to some internal data structure or to have access to the final attributes. The APU provides the hardware implementation of the generalized meta-data cache. Appropriate mechanisms are provided to ensure that the data in the generalized meta-data cache are coherent with respect to the software view of them the File system running on the host processor. The APU performs the meta-data look-up part of the VFS call in advance. This scheme is referred to as the Advance Generalized Look-up scheme. The result of the look-up, and the pointer to a validity flag for the result, is then sent along with the VFS call to the file system running on the host processor. This can be applied to other protocols as well, such as database and XML protocols.

A generalized look-up is also used to provide mapping of file pointers to the block of data in the block-cache.

Note that the generalized look-up structure can also be accessed in a co-processor model as well. In this case access is in a synchronous mode from the host processor.

Selective Early Completion

In certain cases, the file system network request only comprises reading a meta-data pointer or some file attributes. The requests that only require a cache look-up, and are read-only, are completed by the pre-processor without the need to go to the host processor. There are mechanisms in place to ensure consistency/coherency of the read data with respect to other operations executing on the host processor.

The specialized process of the present invention only needs a subset of the type of commands needed by a general purpose processor. In particular, it needs instructions related to copying and moving data, as well as doing look-ups. It also needs to be able to do ALU and branch operations, as well as locking and unlocking of blocks of data to avoid conflicts with other processors trying to access the same data.

Software Models and Logical Flow

Figure 12:
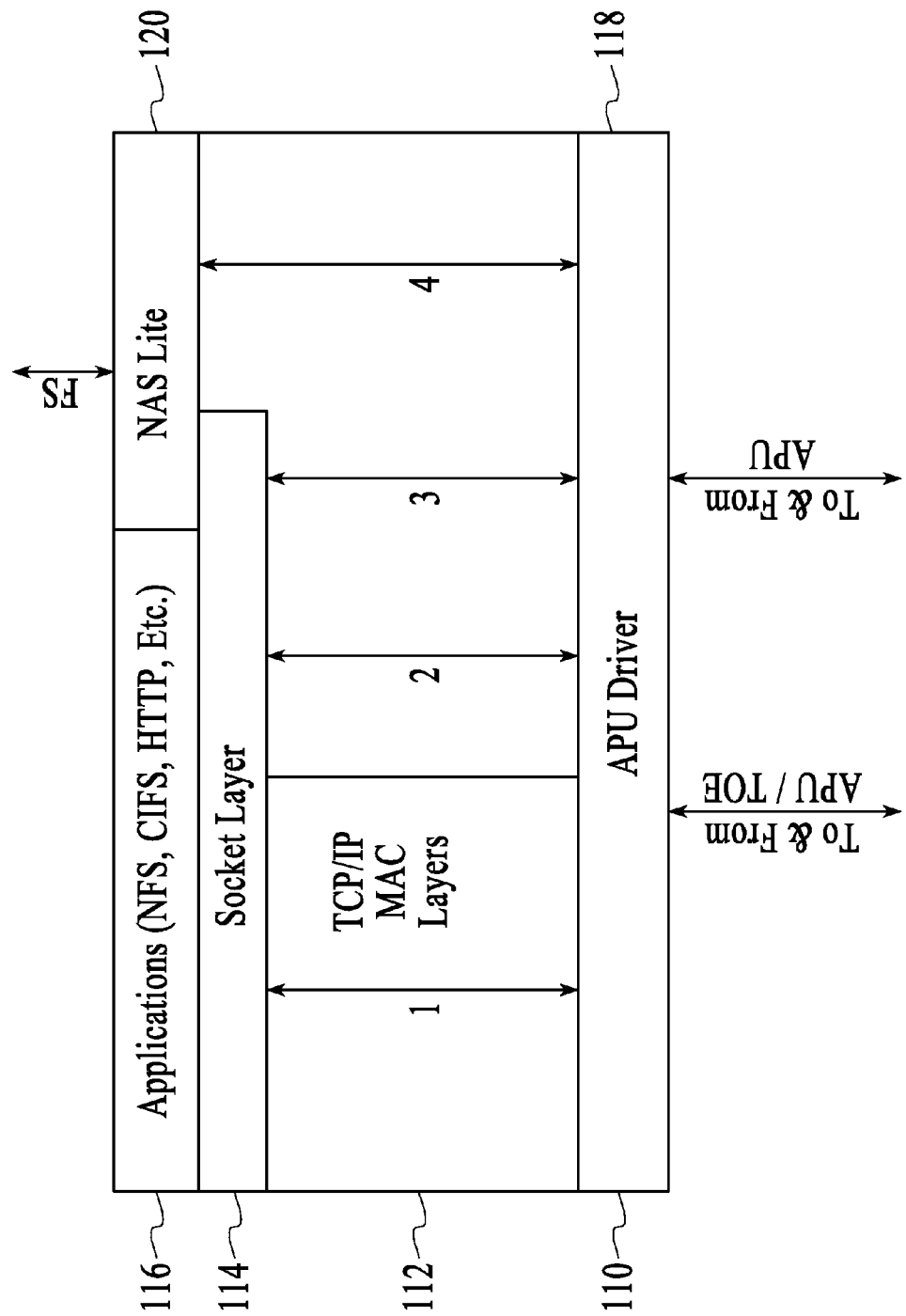
FIG. 12 is a diagram of the host driver structure according to an embodiment of the invention.

FIG. 12 shows an embodiment of the host software drivers according to an embodiment of the invention. APU driver 118 is used to communicate with the APU. A TOE driver 110, as used in the prior art, is also used here. However, it may be modified to take advantage of the flexibility allowed by actually passing messages through the APU. The messages not pre-processed by the APU, are passed by the APU driver to the TOE driver. A path 1 through a TCP/IP and MAC layer 112 is used for certain TOEs where the host is involved at these layers to set up a session. Subsequent communication, or other types of TOEs, use path 2, relying on the TOE to handle the TCP/IP and MAC layers. The communication is to socket layer 114 and then to application layer 116 (NFS, CIFS, HTTP, etc.). For messages pre-processed by the APU, APU driver passes them directly to the upper layers. A path 3 may be used to communicate with socket layer 3 directly, or even the socket layer may be bypassed to communicate over a path 4 with and NAS lite layer 120 (NAS is used as an example, other file access applications may be used). Path 4 can be used where the APU has already done NAS processing. Thus, the host can communicate with the APU at different software levels, or at a hardware level, depending on the configuration desired. In one embodiment, path 4 is used for management of traffic, such as cache updates.

Figure 13:
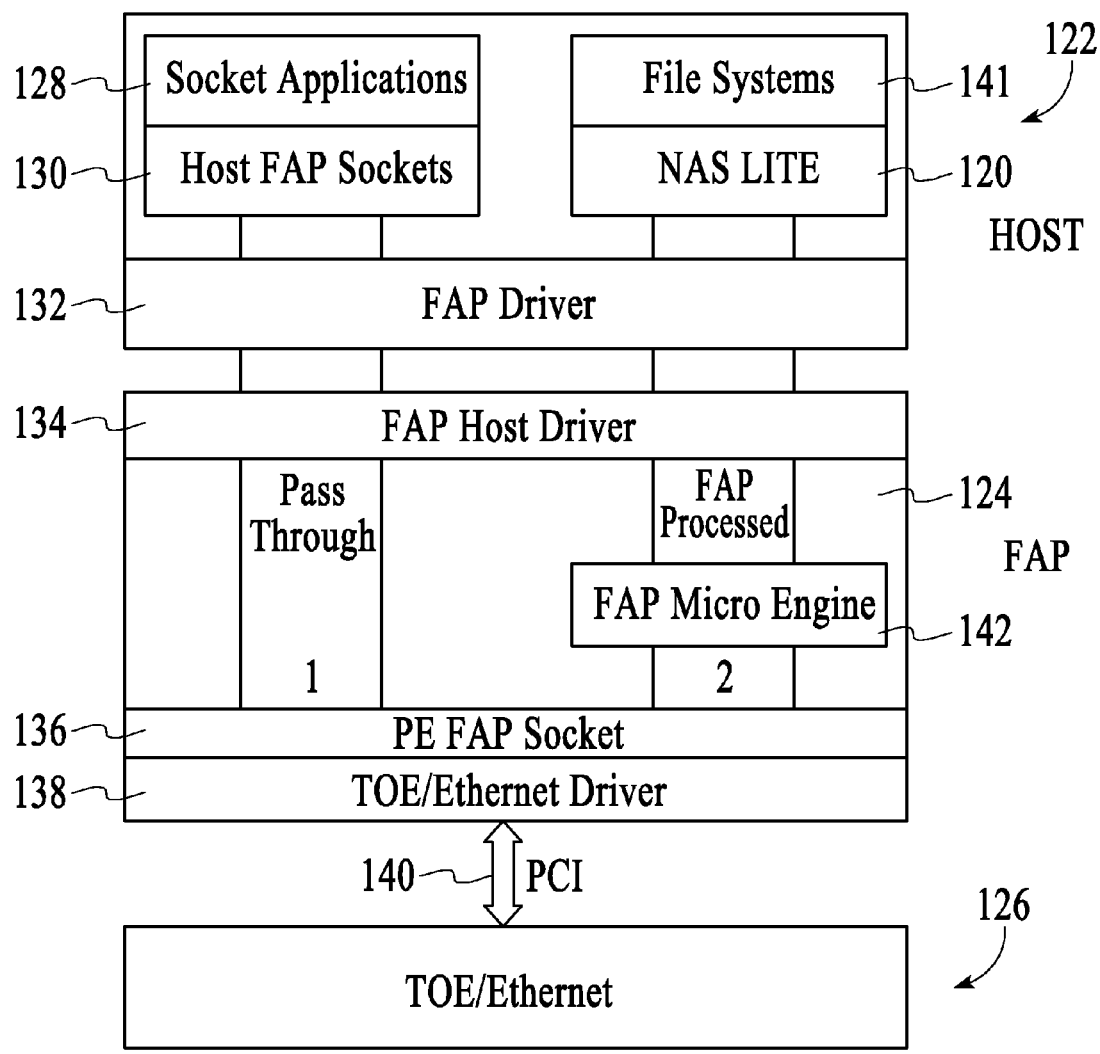
FIGS. 13 and 14 are diagrams of the logical flow between the software of the host, TOE and FAP (File Access Processor) according to an embodiment of the present invention.

FIG. 13 is a diagram of the software logical flow in one embodiment of the invention. This and the following figures apply in particular to embodiment for accessing files, and the embodiment of a Application Processor Unit (APU) shown is referred to as a File Access Processor (FAP). Other types of APUs could alternately be used. The FAP physically operates on a Processing Engine (PE), which may, for example, be an embedded CPU.

FIG. 13 shows the software in host 122, FAP 124 and TOE/Ethernet 126. As can be seen, two virtual pipes are illustrated, a "passthrough" pipe 1, and a FAP processed pipe 2. On the host side, for pipe 1, socket applications 128 communicate through host FAP sockets 130 and FAP driver 132. This communicates on the FAP 124 side with FAP host driver 134, and then passes through to PE FAP socket 136 and TOE/Ethernet driver 138. Driver 138 communicates over PCI bus 140 with TOE/Ethernet 126.

In one embodiment, path 1 is used to pass through packets not belonging to NAS protocols. The packet headers are examined, and if they do not belong to an NAS protocol, they are passed through.

Path 2 is used for NAS request acceleration. At host 122, file systems 141 communicate through NAS lite layer 120 and FAP driver 132. FAP 124 similarly uses FAP host driver 134 and an FAP microengine 142, which then communicates with PE FAP socket 136 and TOE/Ethernet driver 138.

Figure 14:
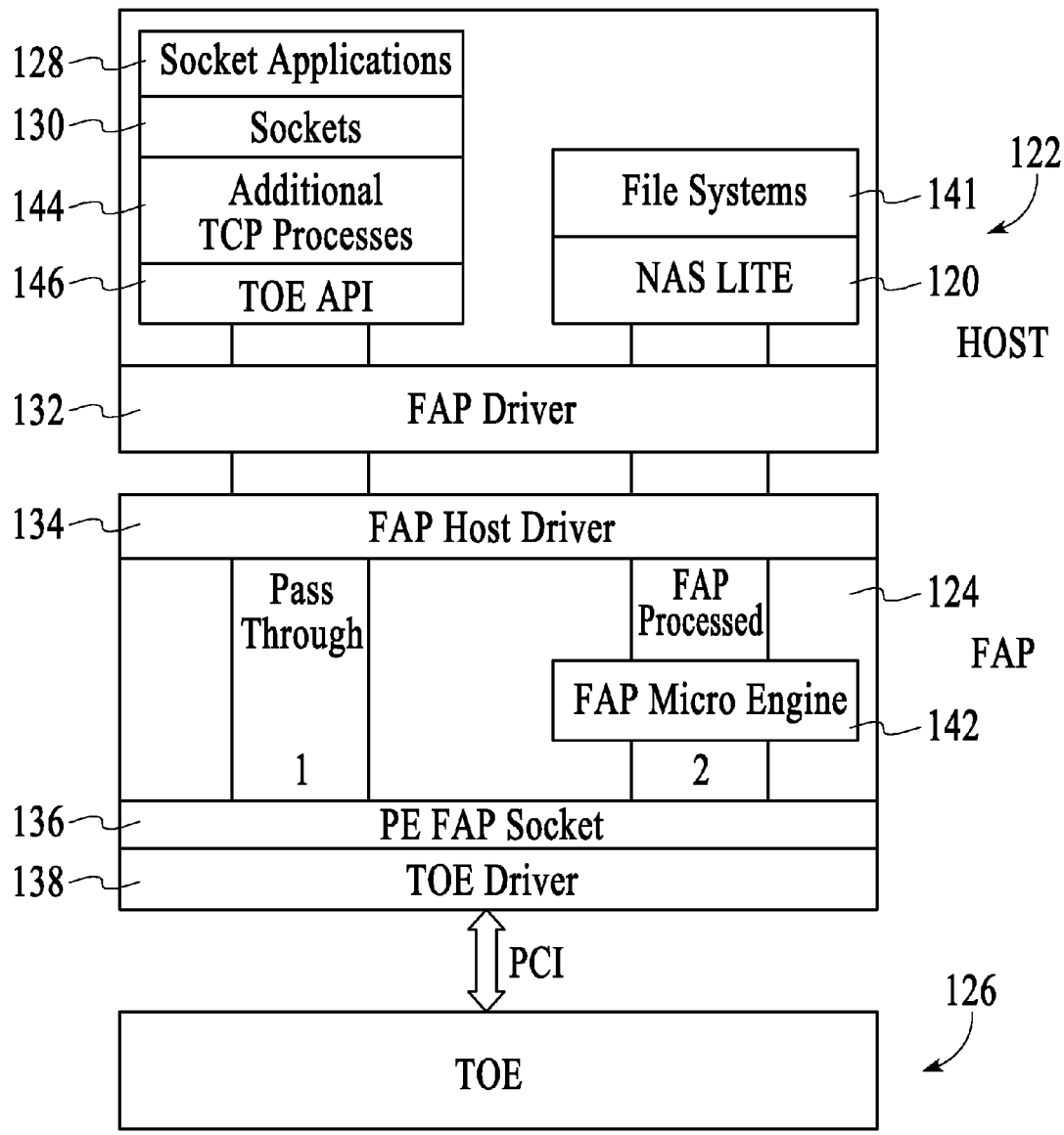

FIG. 14 also shows a logical flow with two different virtual pipes, 1 and 2, between PE FAP socket layer 136 in FAP 124 and the host. Path 1 can be used to pass through all packets not accelerated by FAP 124. These packets can consist of raw (Ethernet/MAC) packets not TCP-processed, and all TCP-processed non-NAS packets. FIG. 14 differs from FIG. 13 in showing an additional TCP processes layer 144 and a TOE API layer 146. This could be used, for example, where the host does some of the TCP processing, such as setting up a TCP communication link initially, which is not offloaded by some TOE processors. In one embodiment, host driver 134, PE FAP socket 136 and TOE driver 138 are implemented in firmware.

As can be seen from the diagrams of FIGS. 13 and 14, the socket layer is stretched, or split, into two parts, part on the host and part on the FAP 124.

PE 136 receives TCP processed network packets from TOE 126 at the socket layer, PE 136 classifies these into
  1. Non-NAS related socket traffic
  2. NAS related traffic PE 136 passes above classified packets to FAP through two different FAP registers HOST_SOCK_DMA_REG and PE_RCV_BUF_REG respectively. Packets sent to FAP take three paths in the FAP
  1. Non-NAS related packets are DMAed to the host directly
  2. Partially processed NAS packets are sent to the host for further processing and
  3. Responses are generated for fully processed NAS packets and are sent back to the PE for transmit.

The next three figures show above scenarios.

Non NAS Packet Receive

Figure 15:
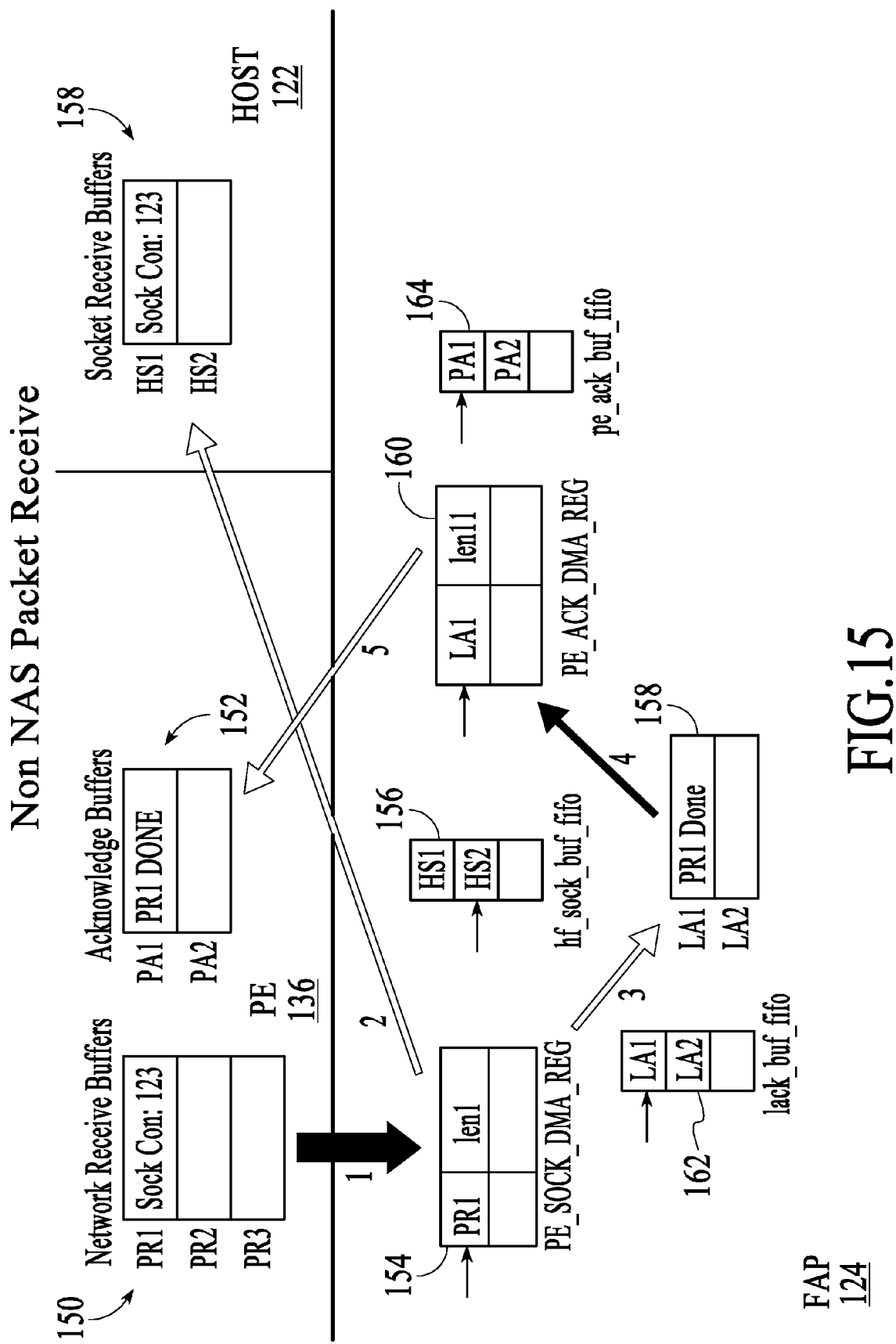
FIGS. 15-21 are diagrams of the data flow for different types of requests and responses according to embodiments of the present invention.

FIG. 15 illustrates the data flow for the receipt of a non-NAS packet. This is a type of packet that, when identified, is DMAed to the host directly. As shown in FIG. 15, PE 136 includes Network Receive Buffers 150 and Acknowledge Buffers 152. In step 1, the address of the Network Receive Buffer (PR1) and the length of the packet (LEN1) is provided to a DMA register 154. In a second step, one of host socket buffers 156 is allocated in FAP 124. The data is then DMAed from PE memory to the host memory in one of the host Socket Receive Buffers 158. The host is then interrupted (not illustrated in the figure).

An acknowledgement is then generated in steps 3, 4 and 5. The acknowledgement is formed in a register 158 and then pushed into a DMA acknowledgement register 160 along with length LEN 11. Register 158 is pointed to by a FIFO buffer 162, while DMA acknowledgement register 160 is pointed to by a FIFO buffer 164. A summary of the steps of FIG. 15 is set forth below:
  1. PE passes address, PRI, and length, len1, of the packet received to FAP through PE_SOCK_DMA_REG
  2. FAP gets a host socket buffer, HS1, from hf_sock_buff_fifo and DMAes the packet from PE buffer, PRI, to host buffer, HS1. And the host is interrupted (not shown in the figure)
  3. FAP forms an ack in LA1, obtained from lack_buf_fifo, for receive packet PRI
  4. FAP sets up a DMA of ACK by pushing LA1 and length len11 into PE_ACK_DMA_REG
  5. FAP DMAes ACK in LA1 to PE ack buffer PA1 obtained from pe$_{ack}$_buf_fifo

NAS Request Partial Processing

Figure 16:
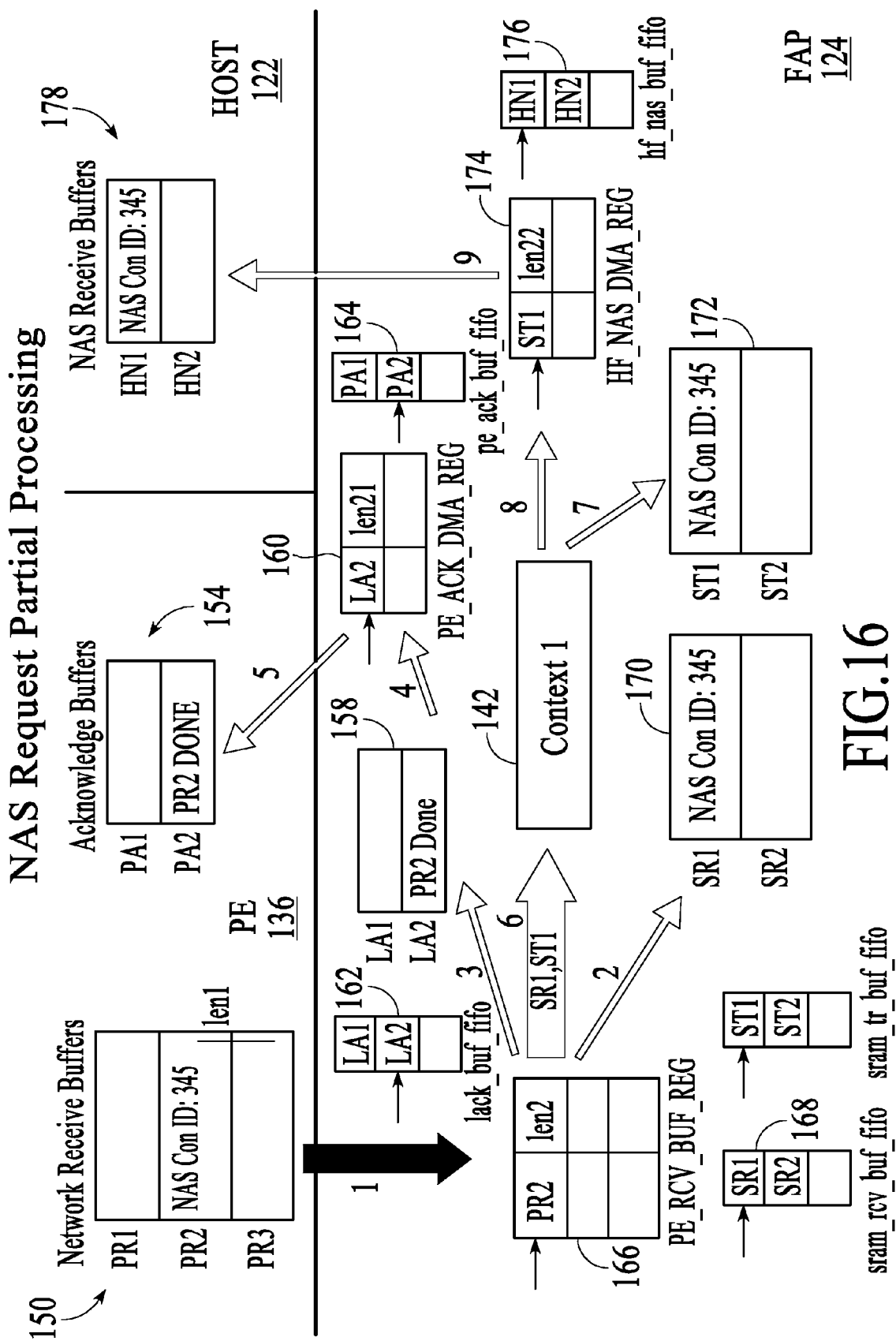

FIG. 16 shows the example of the logic flow for an NAS request partial processing. In this example, some processing of the message is done before it is forwarded to the host 122. As illustrated, in step 1 the PE 136 passes the address (PR2) and the length (LEN2) of the received NAS packet to FAP 124 through a receive buffer register 166. Using a receive buffer FIFO 168, FAP 124 allocates a local SRAM receive buffer 170, in the example shown, SR1. Using a direct memory access (DMA), the packet is then transferred from the network receive buffer 150 in PE 136 (in this example PR2) through receive buffer 166 to SR1.

The acknowledgement is then generated through steps 3, 4 and 5 similarly to as shown in FIG. 15, using FIFO 162, register 158, register 160 and FIFO 164.

FAP 124 then allocates a local SRAM transmit buffer 172, in this example ST1. The FAP micro engine 142, labeled "context 1" in FIG. 16, then partially process the NAS packet using microcode and forms a packet to be transmitted to the host which is put in the ST1 buffer in step 7.

In steps 8 and 9, the partially processed NAS request is DMAed to host 122 using a host DMA register queue 174 and a FIFO buffer pointer 176 to one of NAS receive buffers 178 in host 122.

A summary of the steps executed in FIG. 16 is set forth below.

1. PE passes address, PR2, and length, len2, of the received NAS packet to FAP through PE_RCV_BUF_REG
2. FAP gets a local SRAM receive buffer, SR1, from sram_rcv_buf_fifo and DMAes the packet from PE memory, PR2, to FAP memory, SR1.
3. FAP forms an ack in LA2, obtained from lack_buf_fifo, for receive packet PR2
4. FAP sets up a DMA of ACK by pushing LA2 and length len21 into PE_ACK_DMA_REG
5. FAP DMAes ACK in LA2 to PE ACK buffer PA2 obtained from pe_ack_buf_fifo
6. FAP allocates a local SRAM transmit buffer. ST1, from sram_tr_buf_fifo and injects the NAS packet in SR1 along with transmit buffer ST1 into micro engine, Context 1
7. Micro code processes the NAS packet partially and forms a packet to host in ST1 buffer
8. Micro code sets up a DMA of the partially processed NAS request by pushing the address, ST1 and length, len22, of the packet into the host DMA queue, HF_NAS_ DMA_REG
9. FAP gets a host NAS buffer, HN1, from hf_nas_buf_fifo and DMAes the packet from FAP SRAM memory, ST1, to host memory, HN1. And host is interrupted (not shown in the figure)

NAS Request Early Termination

Figure 17:
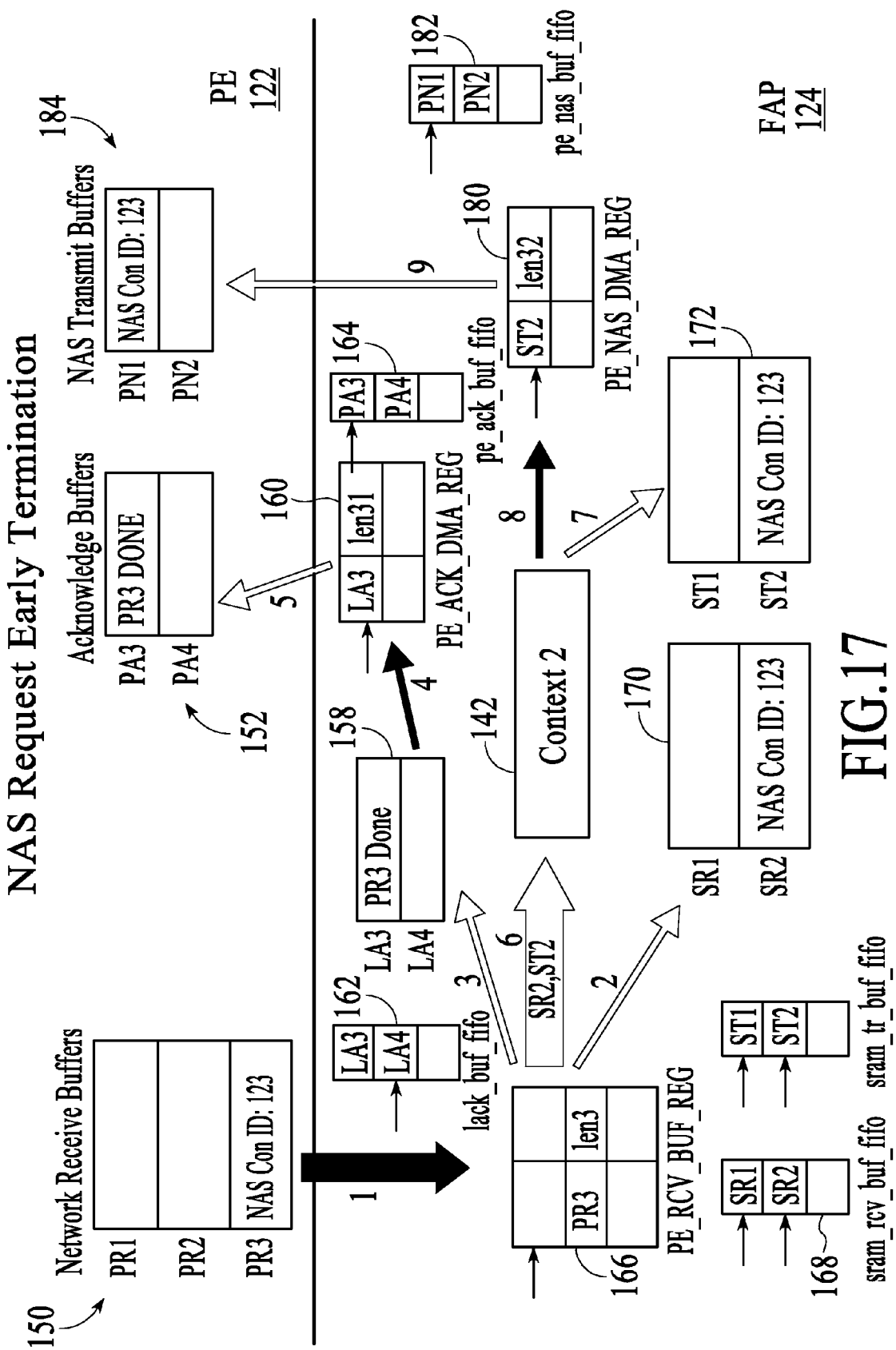

FIG. 17 diagrams the logic flow for an NAS request with early termination. In this example, FAP 124 is able to fully process the request and send a response without needing to bother the host. As can be seen, the host is not shown at all in FIG. 17. The message is processed similarly to the partial processing shown in FIG. 16. However, instead of using a host DMA queue, a PE DMA queue 180 and associated buffer FIFO 182 are used, with the data being sent by DMA access back to the PE 122 into its NAS transmit buffers 184. A summary of the steps followed in the logic flow of FIG. 17 is set forth below.

1. PE passes address, PR3, and length, len3, of the received NAS packet to FAP through PE_RCV_BUF_REC
2. FAP gets a local SRAM receive buffer, SR2, from sram_rcv_buf_fifo and DMAes the packet from PE memory, PR3, to FAP memory, SR2.
3. FAP forms an ack in LA3, obtained from lack_buf_fifo, for receive packet PR3
4. FAP sets up a DMA of ack by pushing LA3 and length len31 into PE_ACK_DMA_REG
5. FAP DMAes ack in LA3 to PE ack buffer PA3 obtained from pe_ack_buf_fifo
6. FAP allocates a local SRAM transmit buffer; ST2; from sram_tr_buf_fifo and injects the NAS packet in SR2 along with transmit buffer ST2 into the micro engine, Context 2
7. Microcode processes the NAS packet fully and forms a response packet in the ST2 buffer
8. Microcode sets up a DMA of the NAS response by pushing the address, ST2 and length, len31, of the packet into PE DMA queue, PE_NAS_DMA_REG
9. FAP gets a PE NAS buffer, PN1, from pe_nas_buf_fifo and DMAes the packet from FAP SRAM memory, ST2, to PE memory, PN1. And finally PE is interrupted (not shown in the figure)

Figure 18:
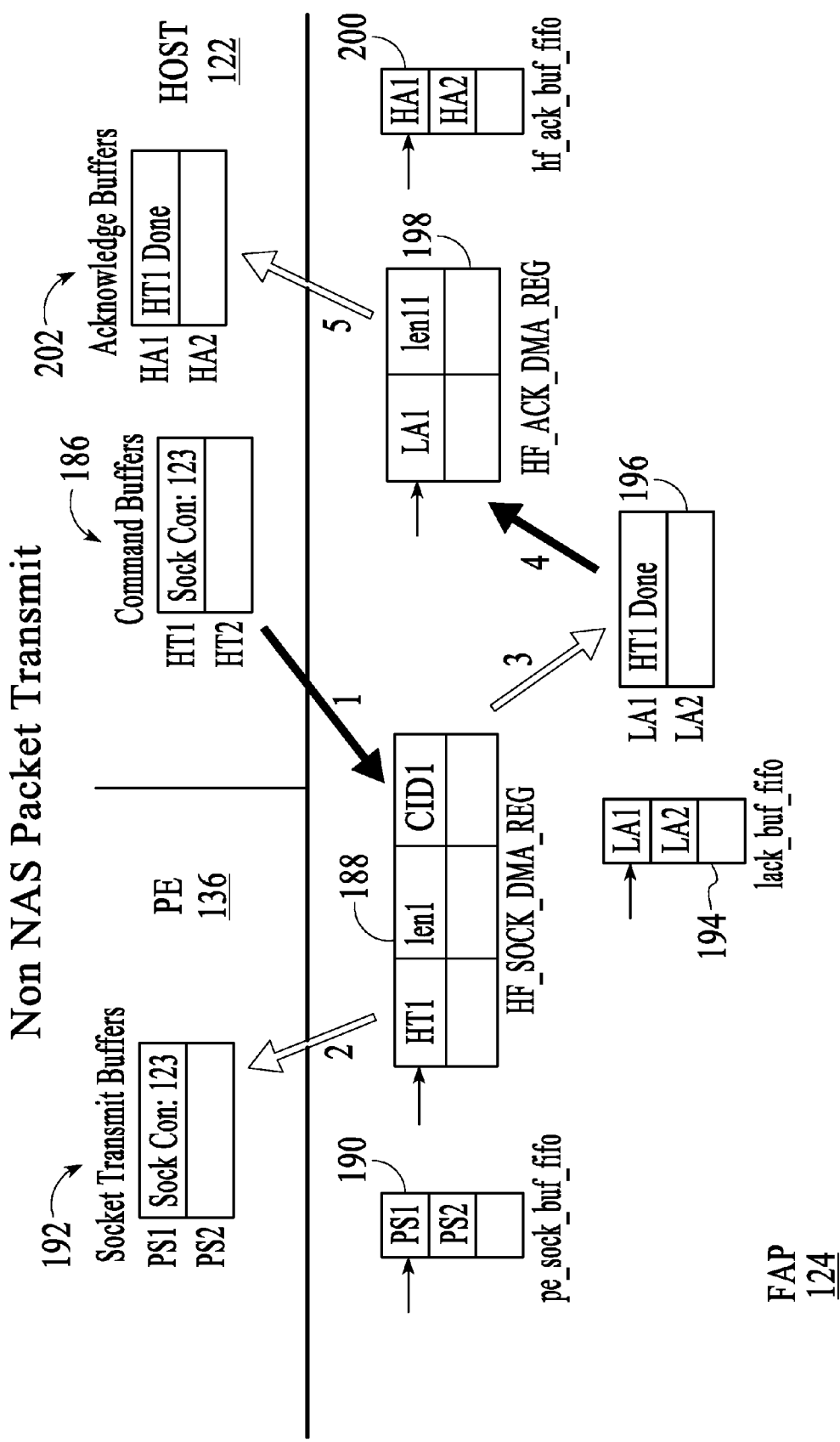
Figure 19:
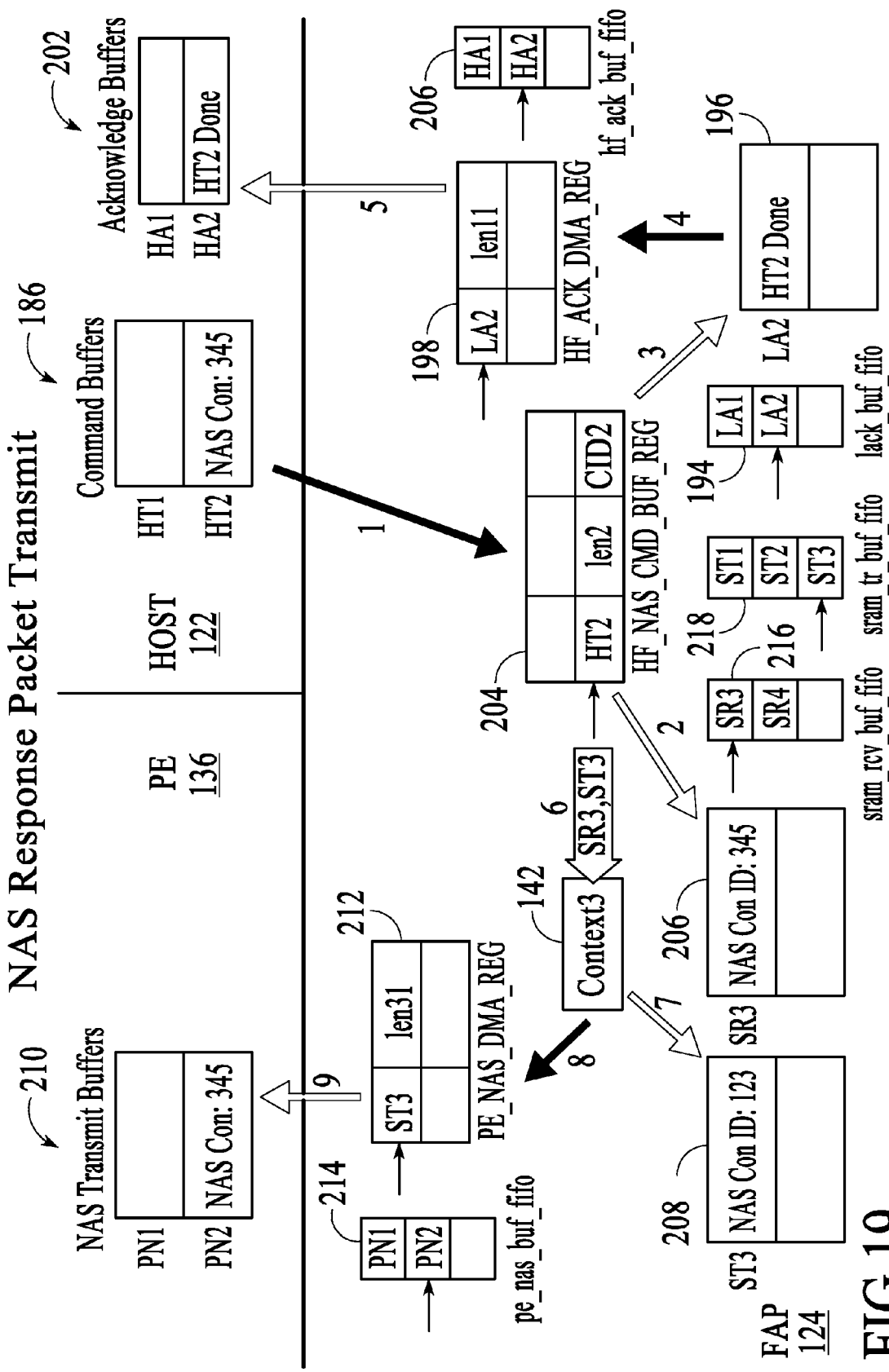

FIGS. 18 and 19 deal with the data flow for transmissions from the host back to FAP 124 and to the TOE. Transmit packets can be categorized into two different types 1. Non-NAS related packets
2. NAS responses

Non NAS Packet Transmit

FIG. 18 shows the logical flow for a transmission from the host where it is a non-NAS packet. A command is formed in the command buffer 186 and is sent to FAP 124 by writing the address (HT1) the length (LEN1) and the command context ID (CID1) into a host socket DMA register 188. This is then transmitted to PE 136 in a DMA access using a PE socket buffer FIFO 190 to put the message in socket transmit buffers 192 in PE 136.

In one embodiment, an acknowledgement packet to host 122 is accomplished using an acknowledge buffer FIFO 194, a local response buffer 196, host acknowledge DMA register 198 and host acknowledge buffer FIFO 200 to provide an acknowledge back to acknowledge buffer 202 of host 122. In another embodiment, the acknowledgement packet may be generated by the PE. A summary of the steps performed in FIG. 18 is set forth below.

1. Host forms a command along with a non-NAS packet and sends it to FAP by writing the address, HT1, length, len1, and command context ID, CID1, of the packet to a FAP register, HF_SOCK_DMA_REG.
2. FAP DMAes the host command along with the transmit packet from host memory, HT1, to a PE socket buffer, PS1, obtained from pe_sock_buf_fifo. FAP interrupts the PE (not shown in the picture)
3. (FAP acts like a proxy for the command. FAP acknowledges the command if CID is a valid one. CID '0' is used to indicate the acknowledgement will come from the target, PE). FAP forms an ack to the command in a local response buffer, LA1, obtained from lack_buf_fifo
4. FAP sets up a DMA in HF_ACK_DMA_REG to send the response in LA1 to the host
5. FAP obtains a host socket ack buffer HA1, from hf_ack_buf_fifo and DMAes the response in LA1 into host memory HA1. Host is interrupted (not shown in the picture)

NAS Response Packet Transmit

There are two ways in which an NAS response can be formed.
1. FAP micro engine early terminates some NAS requests and forms NAS responses
2. Host sends NAS responses with out XDR to FAP. Micro engine forms NAS responses to them.

The first category above is covered above in FIG. 17, NAS Request Early Termination. The second category is covered in FIG. 19.

As shown in FIG. 19, host 122 generates a command with a NAS response packet and sends it to FAP 124 using NAS command buffer register 204. FAP allocates SRAM receive buffer 206 and receives the command through a DMA, then the command in SRAM receive buffer 206 is operated on by micro engine 142. FAP also allocates a local SRAM transmit buffer 208, which is used by the micro engine to generate the NAS response. FAP provides a DMA write of the NAS response in SRAM transmit buffer 208 to NAS transmit buffers 210 of PE 136 using PE_NAS_DMA register 212 and FIFO buffer 214. The receive and transmit SRAM memory are pointed to by receive FIFO buffer 216 and transmit FIFO buffer 218. The acknowledge is done in the same manner as described in FIG. 18 above.

Set forth below is a summary of the steps followed.
1. Host forms a command along with a NAS response packet and sends it to FAP by writing the address, HT2, length, len2, and command context ID, CID2, of the packet to a FAP register, HF_NAS_CMD_BUF_REG.
2. FAP DMAes host command along with the transmit packet from host memory, HT2, to a local SRAM receive buffer, SR3, obtained from sram_rev_buf_fifo.
3. (RAP acts like a proxy for the command. FAP acknowledges the command if CID is a valid one. CID '0' is used to indicate the acknowledgement will come from the target, Micro Code). FAP forms an ack to the command in a local response buffer, LA2, obtained from lack_buf_fifo
4. FAP sets up a DMA in HF_ACK_DMA_REG to send the ack in LA2 to the host
5. FAP obtains a host NAS response buffer HA2, from hf_ack_buf_fifo and DMAes the response in LA2 into host memory HA2. Host is interrupted (not shown in the figure)
6. FAP allocates a local SRAM transmit buffer, ST3, from sram_tr_buf_fifo and injects the NAS packet in SR3 along with transmit buffer ST3 into micro engine, Context 3
7. Microcode processes the NAS response packet for XDR and forms a response packet in ST3 buffer
8. Microcode sets up a DMA of the NAS response by pushing the address, ST3 and length, len31, of the packet into PE DMA queue, PE_NAS_DMA_REG
9. FAP gets a PE NAS buffer, PN2, from pe_nas_buf_fifo and DMAes the packet from FAP SRAM memory, ST3, to PE memory, PN2. And PE is interrupted (not shown in the figure)

Command and Response Interface

Commands flow from:
1. Host to FAP, as in transmit NAS response and update a Cache entry,
2. Host to PE, as in transmit a non-NAS packet and for socket setup, The targets of the commands are:
1. Micro-Engine—Microcode handles the command
2. PE—PE host driver/socket layer handles the command The host expects a response for each of the commands it issues. The responses could be:
1. Auto generated by FAP hardware acting like a proxy agent.
2. Target generated by Microcode or PE software.

Many commands don't need explicit responses from the targets. Only the host needs to know that the commands are copied into FAP/PE memories before it can reclaim the command buffers. The FAP hardware acts like a proxy and forms and sends responses to those commands as soon as the DMA of the command is done.

The host knows when it expects a proxy response and when it needs target responses, which indicate completion of the commands. The host conveys this to the FAP through the Command ID, CID. The command header in the command always contains a valid CID. The host, when passing a command, could write a real CID or a 0 (zero) along with the command address and length into FAP command registers.
1. Real CID (non zero value) in the register indicates that host is expecting a proxy response.
2. Dummy CID (value zero) in the register indicates that host is expecting a response from the target after the completion of execution of the command.

For case 1, refer to FIGS. 18 and 19, which illustrate two examples in which responses are auto generated by an FAP proxy.

For case 2, scatter gather is a good example.

Scatter/gather is a technique used to do DMA data transfers of data that is written to non-contiguous areas of memory. A scatter/gather list can be a list of vectors, each of which gives the location and length of one segment in the overall read or write request.

Scatter Gather Write

Figure 20:
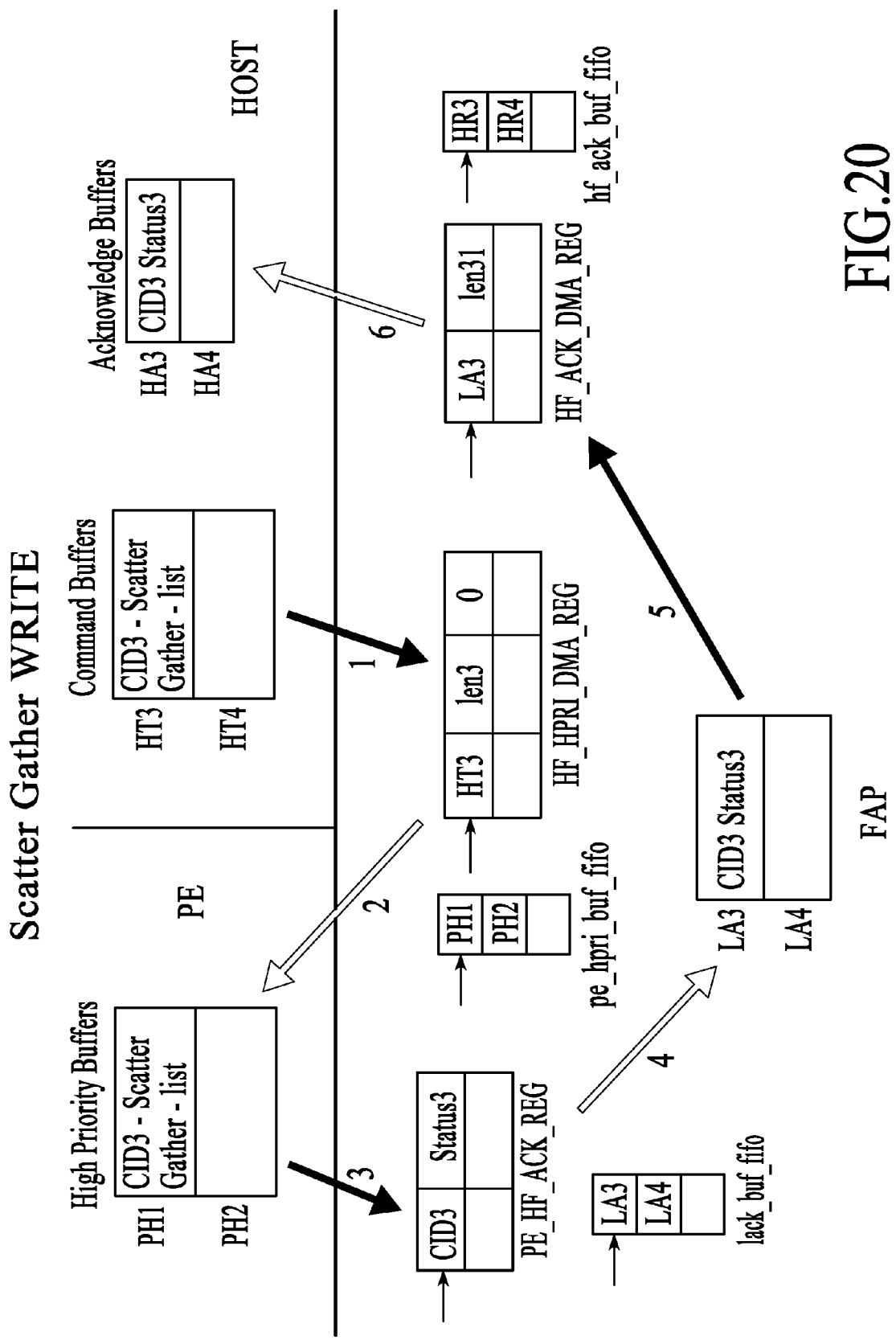

A scatter/gather write operation is illustrated in FIG. 20. The following is a summary of the logic flow of FIG. 20:
1. Host sends the command with Scatter Gather list to FAP through HF_HPRI_BUF_REG. CID field in the register is filled with 0 (zero) telling FAP not to generate any proxy auto response
2. FAP DMAes the scatter gather list buffer in HT3 to PE NAS buffer, PHI, obtained from pe_hpri_buf_fifo.
3. PE passes the list to TOE and TOE fills up the buffers. PE sends the completion of command, CID3 and the status of the execution, status3 to FAP through a register, PE_HF_ACK_REG, write
4. FAP forms an ack to the command in a local response buffer, LA3, obtained from lack_buf_fifo
5. FAP sets up a DMA in HF_ACK_DMA_REG to send the ack in LA3 to the host
6. FAP obtains a host NAS response buffer HA1, from hf_ack_buf_fifo and DMAes the response in LA3 into host memory HA1. Host is interrupted (not shown in the picture) to indicate a command response has arrived.

Scatter Gather Read

Figure 21:
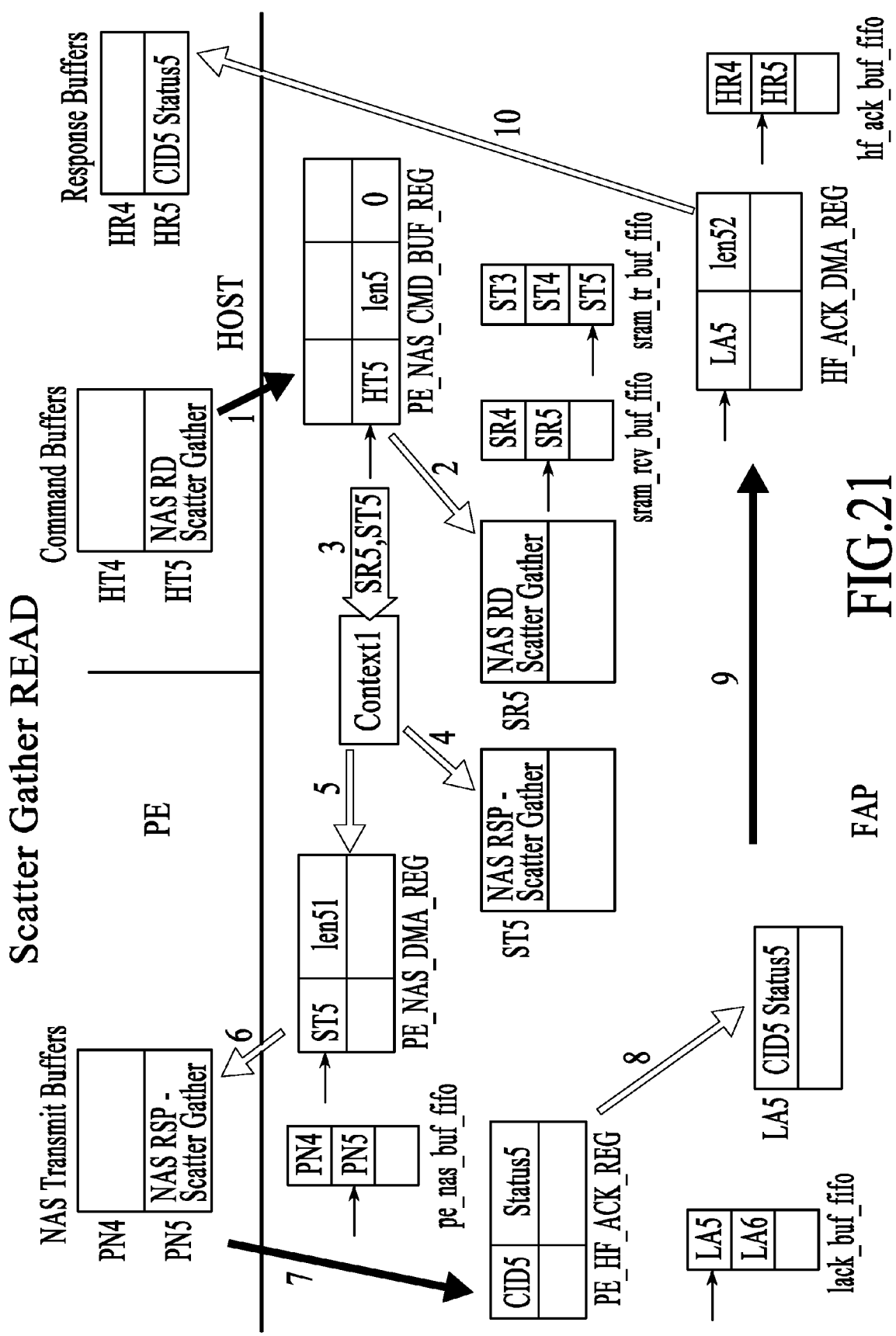

FIG. 21 is a diagram of the logic flow for a scatter/gather read operation. Set forth below is a summary of the logic flow of FIG. 21:
1. Host forms a command along with a NAS READ response packet containing scatter gather list and sends it to FAP by writing the address, HT5, length, len5, and 0 as CID, of the packet to a FAP register, HF_NAS_CMD_BUF_REG. (CID '0' is used to indicate the acknowledgement will come from the target, PE)
2. FAP DMAes host command along with the transmit packet from host memory, HT5, to a local SRAM receive buffer, SR5, obtained from sram_rcv_buf_fifo.

3. FAP allocates a local SRAM transmit buffer, ST5, from sram_tr_buf_fifo and injects the NAS packet in SR5 along with transmit buffer ST5 into micro engine, Context 1
4. Microcode processes the NAS response packet for XDR and forms a response packet in ST5 buffer along with scatter gather list
5. Microcode sets up a DMA of the NAS response by pushing the address, ST5 and length, len51, of the packet into PE DMA queue, PE_NAS_DMA_REG
6. FAP gets a PE NAS buffer, PN5, from pe_nas_buf_fifo and DMAes the packet from FAP SRAM memory, ST5, to PE memory, PN5. The PE is interrupted (not shown in the figure)
7. PE passes the list to TOE and TOE uses the scatter gather buffers. PE sends the completion of command, CID5 and the status of the execution, status5 to FAP through a register, PE_HF_ACK_REG, write
8. FAP forms an ack to the command in a local ack buffer, LA5, obtained from lack_buf_fifo
9. FAP sets up a DMA in HF_ACK_DMA_REG to send the ack in LA5 to the host
10. FAP obtains a host ack buffer HAS, from hf_ack_buf_fifo and DMAes the response in LA5 into host memory HAS. Host is interrupted (not shown in the picture)

Control Traffic

Control traffic between Host and PE follow a similar path as non-NAS packets take as in FIG. 18, Non NAS Packet Transmit, for Host to PE communication, and FIG. 15, Non NAS related packet receive, for PE to Host communications.

Though the flow path is the same, they go through different registers, buffer pools and fifos, all of which contain higher priority than the non-NAS traffic counter part. For control packet flow from host to PE, the following set is used (refer to FIG. 18 for comparison)
1. Host sends the control packets to FAP through HF_H-PRI_BUF_REG
2. FAP uses a PE high priority buffer obtained from pe_h-pri_buf_fifo and DMAes host packet to PE buffer
3. FAP internally uses HF_ACK_DMA_REG to queue DMA request to send an ack packet to host
4. FAP uses hf_ack_buf_fifo buffers to DMA responses to host
5. If proxy was not requested, PE may use PE_HF_ACK_REG, to request FAP to send an ack.

For control packets flow from PE to host following set is used (refer to FIG. 15 for comparison)
1. PE sends the DMA command to FAP through register: PE_HPRI_DMA_REG
2. FAP DMAes the packet to host DMA buffer obtained from: hf_hpri_buf_fifo
3. FAP indicates the DMA completion to PE through a PE ack buffer obtained from pe_ack_buf_fifo Non Scatter Gather Data Transfer Some TOES work without scatter gather for data transfers. FAP also handles this scenario in one embodiment. The FAP can support scatter gather even if the TOE does not.

There is no difference in the flow for READ requests. Since WRITE requests may need to buffer large amounts of data to simulate scatter gather, a different mechanism is used.

The write header goes through the same path as before. All the data buffers, even though they belong to NAS, take a path similar to non-NAS packets, but use different registers, buffers pools and fifos. Write data uses the following register (refer to FIG. 15 Non NAS related packet receive for reference)
1. PE sends the DMA command to FAP through register: PE_NAS_WR_DMA_REG
2. FAP DMAes the packet to host DMA buffer obtained from: hf_nas_wr_buf_fifo
3. FAP indicates the DMA completion to PE through a buffer obtained from pe_ack_buf_fifo.

Interrupt Handling

The interrupt mechanism on FAP is managed by ISR, IRR and ICR registers. There are two sets of interrupt registers on FAP each one managing follow two categories respectively:
1. Interrupt mechanism between FAP and PE and
2. Interrupt mechanism between FAP and Host FAP and PE Interrupts FAP uses FE_ISR register to keep the status of any interrupts to PE. FAP uses PE_IMR to mask off any interrupts to PE. The PE interrupt line is kept high as long as any bits in PE_ISR are set which are not masked by PE_IMR register. The PE_ICR register is used by the host to clear any interrupts.

FAP maintains a group of FIFOs to handle communications between PE and FAP. PE_ISR bits are set.
1. If read/write pointers are not the same for FIFOs, those are used to indicate packet arrival on PE for host or a PE requested DMA done
2. Underflow/overflow condition of FIFOs keep PE buffers and take PE commands PE_ISR may be cleared whenever above conditions are not present or cleared explicitly by the PE.

FAP and Host Interrupts

FAP uses HF_ISR register to keep the status of any interrupts to host. FAP uses HF_IRR to mask off any interrupts to host. The host interrupt line is kept high as long as any bits in HF_ISR are set which are not masked by HF_TRR register. FAP keeps a shadow copy of HF_ISR on the host. HF_ICR register is used by host to clear any interrupts.

HF_ISR bits are set if any DMA is done to the host or an exceptions condition happened on the FAP like FIFO overflow or underflow.

As will be understood by those with skill in the art, the present invention may be embodied in other specific forms without departing from the essential characteristics thereof. For example, the data control buffers could be in SRAM, DRAM, or even in the on-board cache of the host processor. The specialized processor could be either a pre-processor, or a co-processor. The processor of the invention could be integrated on the same semiconductor chip as the TOE, or as the host. Alternately, the processor could be integrated with a memory controller or any other device. Instead of having a duplicate cache, a dual-ported single cache could be shared by the host and the processor of this invention. Accordingly, the foregoing description is intended to be illustrative, but not limiting, of the scope of the invention which is set forth in the following claims.

What is claimed is:
1. A processor, coupled to a host and to a receive mechanism, the processor comprising:
a first interface configured to receive a network message sent to said host, wherein said network message has already been processed in OSI levels 1-4 by said receive mechanism;
an engine configured to perform at least some processing of said network message above OSI level four; and a second interface configured to provide results of said processing to said host.

2. The processor of claim 1 further comprising: a third interface configured to provide said results to a remote processor other than said host.

3. The processor of claim 1 wherein said processor is a pre-processor, said first interface is an interface to a TCP-IP offload engine, and said second interface is an interface to said host.

4. The processor of claim 1 wherein said processor is a co-processor and said first and second interfaces are part of a host interface.

5. The processor of claim 1 further comprising: a cache memory interface; and wherein said processor is configured to access meta data in a cache memory.

6. The processor of claim 5 wherein said processor is further configured to access data in said cache memory.

7. The processor of claim 1 wherein said processor is further configured to look-up meta data, and pass said meta data to said host.

8. The processor of claim 1 wherein said processor is further configured to parse a header in said message.

9. The processor of claim 1 further comprising an interface to a co-processor.

10. The processor of claim 9 wherein said co-processor is a security processor.

11. The processor of claim 1 wherein said engine is configured to completely process and return certain messages without forwarding said certain messages to said host.

12. The processor of claim 1 wherein said engine is configured to communicate with said host by writing to and reading from a commonly accessible control and data buffer.

13. A processor, coupled to a host, comprising:
a first interface configured to receive network messages sent to said host;
an engine configured to perform all processing of certain of said network messages above OSI level four; and
wherein said engine is further configured to completely process and return said certain of said network messages without forwarding said certain messages to said host.

14. The processor of claim 13 wherein at least one of said certain of said network messages involve accessing of meta data, but not data pointed to by said meta data.

15. The processor of claim 13 wherein said processor is a pre-processor, processor, said first interface is an interface to a TCP-IP offload engine, and further comprising a second interface to said host.

16. The processor of claim 13 wherein said processor is a co-processor, and said first interface is part of a host interface.

17. The processor of claim 13 further comprising: a cache memory interface; and wherein said processor is configured to access meta data in a cache memory.

18. The processor of claim 17 wherein said processor is further configured to access data in said cache memory.

19. The processor of claim 13 wherein said processor is configured to look-up meta data, and return said meta data to an originator of said network message.

20. The processor of claim 13 wherein said processor is further configured to parse a header in said message.

21. The processor of claim 13 further comprising an interface to a co-processor.

22. The processor of claim 21 wherein said co-processor is a security processor.

23. A pre-processor, coupled to a host, comprising:
a TCP-W offload engine (TOE) configured to perform TCP and IP processing on a network message sent to said host;
an engine configured to perform at least some processing of said network message above OSI level four, including accessing meta data in a cache memory and parsing a header in said message;
a host interface configured to provide results of said processing to said host; and
a cache memory interface.

24. The pre-processor of claim 10 wherein said engine is configured to pass certain messages between said TOE and said host without modification so that said pre-processor is transparent to said TOE.

25. A host comprising:
a first processor;
a network interface including a TCP/IP offload engine (TOE);
a second processor configured to receive messages from said TOE including a processed header above OSI level four and meta data looked up by said first processor;
said first processor being further configured to respond to said message using said processed header and said looked up meta data.

26. The host of claim 25 further comprising:
a first driver configured to communicate with said first processor; and
a second driver configured to communicate with said TOE.

27. The host of claim 26 wherein said second driver is configured to communicate with said TOE through said first processor.

* * * * *

UNITED STATES PATENT AND TRADEMARK OFFICE
CERTIFICATE OF CORRECTION

PATENT NO.          : 7,596,634 B2                                    Page 1 of 1
APPLICATION NO.     : 10/352800
DATED               : September 29, 2009
INVENTOR(S)         : Millind Mittal and Murali Repakula It is certified that error appears in the above-identified patent and that said Letters Patent is hereby corrected as shown below:

Column 17, line 45, the word "processor" should be deleted.

Column 17, line 49, the "," after the word co-processor should be deleted.

Column 18, line 16, the word "TCP-W" should be changed to -- TCP-IP --.

Signed and Sealed this

Fifteenth Day of June, 2010

David J. Kappos
*Director of the United States Patent and Trademark Office*